(12) United States Patent
Junge et al.

(10) Patent No.: US 10,108,058 B2
(45) Date of Patent: Oct. 23, 2018

(54) DEVICE FOR REGULATING THE PASSAGE OF ENERGY

(71) Applicant: Merck Patent GmbH, Darmstadt (DE)

(72) Inventors: Michael Junge, Pfungstadt (DE); Andreas Beyer, Hanau (DE); Ursula Patwal, Reinheim (DE)

(73) Assignee: Merck Patent GmbH, Darmstadt (DE)

( * ) Notice: Subject to any disclaimer, the term of this patent is extended or adjusted under 35 U.S.C. 154(b) by 0 days.

(21) Appl. No.: 14/889,029

(22) PCT Filed: Apr. 9, 2014

(86) PCT No.: PCT/EP2014/000943
§ 371 (c)(1),
(2) Date: Nov. 4, 2015

(87) PCT Pub. No.: WO2014/180525
PCT Pub. Date: Nov. 13, 2014

(65) Prior Publication Data
US 2016/0085108 A1  Mar. 24, 2016

(30) Foreign Application Priority Data
May 8, 2013 (EP) ................................ 13002445

(51) Int. Cl.
*G02F 1/1347* (2006.01)
*C09K 19/60* (2006.01)
(Continued)

(52) U.S. Cl.
CPC .......... *G02F 1/13475* (2013.01); *C09K 19/60* (2013.01); *G02F 1/1337* (2013.01);
(Continued)

(58) Field of Classification Search
CPC .......................... G02F 1/13475; G02F 1/1337
See application file for complete search history.

(56) References Cited

U.S. PATENT DOCUMENTS 4,396,250 A * 8/1983 Wada .................. G02F 1/13475
349/178
4,556,286 A 12/1985 Uchida
(Continued)

FOREIGN PATENT DOCUMENTS

CN 101546084 A 9/2009
CN 102141707 A 8/2011
(Continued)

OTHER PUBLICATIONS

Japanese Office Action dated Jan. 30, 2018 issued in corresponding JP 2016-512235 application (2 pages).
(Continued)

*Primary Examiner* — Sang V Nguyen
(74) *Attorney, Agent, or Firm* — Millen White Zelano and Branigan, PC; Csaba Henter

(57) ABSTRACT

The present application relates to a device for regulating the passage of energy which is characterised in that it comprises at least two switching layers S(1) and S(2) arranged one behind the other, where the switching layers comprise a liquid-crystalline medium comprising at least one dichroic compound.

20 Claims, 5 Drawing Sheets

(51) Int. Cl.
 *G02F 1/133* (2006.01)
 *G02F 1/1337* (2006.01)
(52) U.S. Cl.
 CPC ...... *G02F 1/13306* (2013.01); *C09K 2219/13* (2013.01); *G02F 2001/13324* (2013.01); *G02F 2001/133738* (2013.01); *G02F 2203/48* (2013.01)

(56) References Cited

U.S. PATENT DOCUMENTS

| | | | | |
|---|---|---|---|---|
| 5,943,104 | A * | 8/1999 | Moddel | G02C 7/101 349/120 |
| 5,969,154 | A * | 10/1999 | Hao | C09K 19/3483 252/299.61 |
| 9,134,551 | B2 | 9/2015 | Sukhomlinova et al. | |
| 9,745,512 | B2 | 8/2017 | Wittek et al. | |
| 2005/0057701 | A1 * | 3/2005 | Weiss | G02B 27/0101 349/10 |
| 2005/0174529 | A1 * | 8/2005 | Fukushima | G02F 1/1323 349/197 |
| 2006/0274218 | A1 * | 12/2006 | Xue | G02F 1/133536 349/16 |
| 2009/0147186 | A1 * | 6/2009 | Nakai | G02F 1/13471 349/74 |
| 2009/0244441 | A1 | 10/2009 | Nagato | |
| 2012/0250141 | A1 | 10/2012 | Chen | |
| 2012/0326085 | A1 | 12/2012 | Wittek et al. | |
| 2013/0083284 | A1 * | 4/2013 | Junge | C09K 19/3068 349/196 |
| 2013/0155338 | A1 * | 6/2013 | Junge | C09K 19/3001 349/20 |
| 2013/0258266 | A1 * | 10/2013 | Sukhomlinova | C09K 19/601 349/179 |
| 2013/0271680 | A1 * | 10/2013 | Murata | G02F 1/134336 349/36 |
| 2013/0284270 | A1 | 10/2013 | Zhang | |
| 2013/0329147 | A1 * | 12/2013 | Murata | G02F 1/134363 349/33 |
| 2014/0226096 | A1 * | 8/2014 | Taheri | G02F 1/13306 349/33 |
| 2014/0333985 | A1 * | 11/2014 | Junge | G02F 1/0147 359/288 |
| 2014/0375914 | A1 * | 12/2014 | Murao | G02B 27/26 349/15 |

FOREIGN PATENT DOCUMENTS

| | | |
|---|---|---|
| EP | 0022311 A1 | 1/1981 |
| JP | 2000-347224 A | 12/2000 |
| JP | 2005-173493 A | 6/2005 |
| JP | 2012090938 A1 | 6/2014 |
| TW | 201139626 A1 | 11/2011 |
| WO | 2012047843 A1 | 4/2012 |
| WO | 2012090838 A1 | 7/2012 |

OTHER PUBLICATIONS

Taiwanese Office Action dated Jan. 25, 2018 issued in corresponding TW 103116314 application (17 pages).
English Abstract of JP 2000-347224 A published Dec. 15, 2000.
English Abstract of JP 2005-173493 A published Jun. 30, 2005.
International Search Report from PCT Application No. PCT/EP2014/000943 dated Jul. 4, 2014.
Japanese Office Action dated Apr. 28, 2018 issued in corresponding Japanese 201480025637.4 application (8 pages).

* cited by examiner

5

6

3

5

6

8

3

5

6

8

DEVICE FOR REGULATING THE PASSAGE OF ENERGY

The present application relates to a device for regulating the passage of energy which is characterised in that it comprises at least two switching layers S(1) and S(2) arranged one behind the other, where the switching layers comprise a liquid-crystalline medium comprising at least one dichroic compound, and where the alignment of the molecules of the liquid-crystalline medium in at least one switching state of the device differs in layers S(1) and S(2).

For the purposes of the present invention, the term energy is taken to mean, in particular, energy by electromagnetic radiation in the UV-A, VIS and NIR region. Again in particular, it is taken to mean energy by radiation which is not absorbed or is only absorbed to a negligible extent by the materials usually used in windows (for example glass). According to the definitions usually used, the UV-A region is taken to mean a wavelength of 320 to 380 nm, the VIS region is taken to mean a wavelength of 380 nm to 780 nm and the NIR region is taken to mean a wavelength of 780 nm to 2000 nm. Correspondingly, the term light is generally taken to mean electromagnetic radiation having wavelengths between 320 and 2000 nm.

For the purposes of the present application, the term liquid-crystalline medium is taken to mean a material which has liquid-crystalline properties under certain conditions. The material preferably has liquid-crystalline properties at room temperature and in a certain temperature range above and below room temperature. The liquid-crystalline medium may comprise a single compound, or it may comprise a plurality of different compounds. The liquid-crystalline medium in accordance with the invention typically comprises at least one compound whose molecules have an elongated shape, i.e. are significantly longer in one spatial direction than in the other two spatial directions. This spatial direction is also called the longitudinal axis of the molecule.

For the purposes of the present application, a dichroic dye is taken to mean a light-absorbent compound in which the absorption properties are dependent on the orientation of the compound relative to the direction of polarisation of the light. A dichroic compound in accordance with the present application typically has an elongated shape, i.e. the compound is significantly longer in one spatial direction than in the other two spatial directions. This spatial direction is also called the longitudinal axis of the compound.

In the area of switching devices for regulating the passage of energy through surfaces, for example glass surfaces, a number of different technical solutions have been proposed in past years.

An advantageous solution is the use of switching layers comprising a liquid-crystalline medium mixed with one or more dichroic dyes. By application of a voltage, a change in the spatial orientation of the molecules of the dichroic compound can be achieved in these switching layers, causing a change in the transmission through the switching layer. A corresponding device is described, for example, in WO 2009/141295.

Alternatively, a change in transmission of this type can also be achieved without electrical voltage by a temperature-induced transition from an isotropic state of the liquid-crystalline medium to a liquid-crystalline state, as described, for example, in US 2010/0259698.

The said publications describe the use of a single switching layer which is built up as described above and which can be switched into a state having a relatively high transmission and into a state having a relatively low transmission (bright state and dark state of the device). Devices based on this principle are characterised in that they have only a small difference in the passage of energy between the bright state and the dark state. This difference is also known as the transmission range.

It is of major interest in this connection to provide devices for regulating the passage of energy which have the largest possible capacity for energy regulation, i.e. effect the greatest possible difference in the passage of energy through the device by their switching. They can thus regulate, for example, the input of energy into an interior and thus effectively regulate the temperature of this interior. A desirable device therefore effects not only regulation of the passage of energy in the form of visible light, but also regulation of the passage of energy in the form of invisible thermal radiation, in particular NIR radiation having a wavelength of 780 nm to 2000 nm.

It is furthermore of interest that a bright state of the device having very high energy transmission additionally exists. In the case of low energy irradiation from the outside, this is the only way to achieve a comfortable state in interiors whose energy input is regulated by the device.

The prior art describes (US 2010/0259698) the use of polarisers in order to increase the transmission range of switching devices for regulating the passage of energy. However, this significantly reduces the bright transmission of the devices, which is undesired, as mentioned above.

In the context of the present invention, it has now been found that the above-mentioned technical objects can be achieved by the provision of a device for regulating the passage of energy which has a novel structure.

The invention therefore relates to a device for regulating the passage of energy through a surface, where the device comprises at least two switching layers S(1) and S(2), each of which comprises a liquid-crystalline medium comprising one or more dichroic compounds, and where the device comprises orientation layers O(1), O(2), O(3) and O(4), where the said switching layers and orientation layers are present in the device in mutually parallel planes in the sequence O(1), S(1), O(2), O(3), S(2), O(4), where an orientation axis OA(1)* of the molecules of the liquid-crystalline medium of S(1) which are adjacent to O(2) is present in at least one switching state of the device, and an orientation axis OA(2)* of the molecules of the liquid-crystalline medium of S(2) which are adjacent to O(3) is present, and orientation axes OA(1)* and OA(2)* are not parallel to one another and are parallel to the plane of the switching layers.

A structure of this type has not been proposed to date in the area in question, although a multiplicity of different technical solutions for devices for regulating the passage of energy are known today in the prior art.

This may be due to the fact that a technical prejudice against a structure of this type had to be overcome. This prejudice says that devices which are used in building structures, such as the devices according to the invention, must have the simplest possible structure. High complexity should generally be avoided, even if an equally long lifetime as the less-complex component had been exhibited in practice.

This opinion of the person skilled in the art in the area of civil engineering is so widespread that it has been incorporated into a technical standard: DIN ISO 15686. For a discussion of the sub-factor complexity within the factor component quality and its assumed effect on component lifetime, cf. also F. Ritter, Lebensdauer von Bauteilen und Bauelementen-Modellierung und praxisnahe Prognose

[Lifetime of Components and Construction Element Modelling and Practical Prognosis], dissertation, Darmstadt 2011.

With hindsight, however, the advantages of the device according to the invention (high bright transmission accompanied by a large transmission range) clearly offset the disadvantages of a complicated structure. Neither have any disadvantages with respect to the lifetime been observed to date.

For the purposes of this application, the term orientation axis which is usual in the case of nematic liquid-crystalline media is used to denote the averaged alignment of the longitudinal axes of the molecules of the liquid-crystalline medium in space. The individual alignment of the longitudinal axes of the individual molecules of the liquid-crystalline medium does not have to correspond to the orientation axis in each individual case.

In accordance with the invention, layers O(2) and O(3) of the device do not have to follow one another directly. In a preferred embodiment of the invention, one or more layers are located between them, for example one or more glass layers.

The device is preferably arranged in an opening in a larger two-dimensional structure, where the two-dimensional structure itself does not allow the passage of energy, or only does so to a small extent, and where the opening has relatively high energy transmissivity. The two-dimensional structure is preferably a wall or another outside delimitation of an interior. Furthermore, the two-dimensional structure preferably covers an area of at least the same size, particularly preferably an area at least twice as large as the opening in it in which the device according to the invention is arranged.

The device is preferably characterised in that it has an area of at least 0.05 m$^2$, preferably at least 0.1 m$^2$, particularly preferably at least 0.5 m$^2$ and very particularly preferably at least 0.8 m$^2$.

The device is preferably installed in an opening of a building, container, vehicle or other substantially closed space. It is particularly preferably installed in an opening as described above which has relatively high energy transmissivity in a building, container, vehicle or other substantially closed space. However, the device can be used for any desired interior spaces, particularly if these have only limited air exchange with the environment and have light-transmitting boundary surfaces through which input of energy from the outside in the form of light energy can take place. The use of the device is particularly relevant for interior spaces which are subjected to strong insolation through light-transmitting areas, for example through window areas.

The invention therefore furthermore relates to the use of the device according to the invention, as described above, for regulating the passage of energy through a substantially energy-transmitting area into an interior space, preferably the passage of energy in the form of sunlight.

However, the device according to the invention can also be employed for aesthetic room design, for example for light and colour effects. Its signal action may also occur. For example, door and wall elements comprising the device according to the invention in grey or in colour can be switched to transparent. Furthermore, the device may also comprise a white or coloured flat backlight which is modulated in brightness, or a coloured flat backlight, for example yellow, which is modulated using a guest/host display of another colour, for example blue. Further aesthetic effects can also be produced with the aid of light sources shining in from the side, such as white or coloured LEDs or LED chains, in combination with the device according to the invention. In this case, one or both glass sides of the device according to the invention can either be flat or provided with surface elements comprising roughened or structured glass for the coupling-out of light and/or for the generation of light effects.

Another alternative use, which is likewise a subject-matter of the invention, is the use for regulation of the incidence of light on the eyes, for example in protective goggles, visors or sunglasses, where the device keeps the incidence of light on the eyes low in one switching state and reduces the incidence of light less in another switching state.

The device represents a switchable device. Switching of the device here is taken to mean a change in the passage of energy through the device. This can be utilised in accordance with the invention for regulating the input of energy through the device into a space located behind it.

The device according to the invention is preferably electrically switchable. However, it may also be purely thermally switchable, as described, for example, in WO 2010/118422 for devices for regulating the passage of energy.

In the latter case, the switching preferably takes place through a transition from a nematic state to an isotropic state of the liquid-crystalline medium due to a change in the temperature of the switchable layer comprising the liquid-crystalline medium.

In the nematic state, the molecules of the liquid-crystalline medium, and thus also the dichroic compounds, are ordered, for example aligned parallel to the surface of the device due to the action of an alignment layer. In the isotropic state, the molecules are in unordered form. The ordering of the molecules of the liquid-crystalline medium causes an ordering of the dichroic dyes. The difference between ordered and unordered presence of the dichroic dyes itself causes a difference in the passage of energy through the device according to the invention, in accordance with the principle that dichroic dye molecules have a higher or lower absorption coefficient depending on the alignment with respect to the plane of vibration of the light.

If the device is electrically switchable, it comprises means for the alignment of the molecules of the liquid-crystalline medium of the switching layer by means of electrical voltage. In this case, it preferably comprises four electrodes, one of which is installed on each of the two sides of switching layer S(1) and one of which is installed on each of the two sides of switching layer S(2). The electrodes preferably consist of ITO or a thin, preferably transparent metal and/or metal-oxide layer, for example of silver or FTO (fluorine-doped tin oxide) or an alternative material known to the person skilled in the art for this use. The electrodes are preferably provided with electrical connections. The power supply is preferably provided by a battery, a rechargeable battery, a supercapacitor or by external power supply.

The switching operation in the case of electrical switching by a common spatial alignment of the molecules of the liquid-crystalline medium of a layer takes place by the application of voltage. The molecules of the dichroic compound are thereby likewise aligned, as explained above, so that a difference is effected in the passage of energy through the device.

It is preferred in accordance with the invention for the switching layers to be separately electrically switchable in such a way that alternatively only S(1) or only S(2) or both or neither can be subjected to an electric field.

Application of an electric field preferably causes vertical alignment of the molecules of the liquid-crystalline medium, where vertical is to be understood as relative to the plane of the switching layers. However, it is likewise possible and in certain cases also preferred for the alignment to take place parallel to the plane of the switching layers. How the field has to be designed or how the molecules of the liquid-crystalline medium have to be designed in order that the desired alignment of the molecules by the electric field takes place is known to the person skilled in the art in the area of liquid-crystalline media.

In a preferred embodiment, the switching layer is converted from a state having high absorption, i.e. low passage of energy, which exists without voltage, into a state having lower absorption, i.e. higher passage of energy. The liquid-crystalline medium is preferably nematic in both states. The voltage-free switching state is preferably characterised in that the molecules of the liquid-crystalline medium, and thus the molecules of the dichroic compound, are aligned parallel to the surface of the switching layer (planar orientation). This is preferably achieved by a correspondingly selected orientation layer. The switching state under voltage is preferably characterised in that the molecules of the liquid-crystalline medium, and thus the molecules of the dichroic compound, are perpendicular to the surface of the switching layer (homeotropic orientation).

In an alternative, likewise preferred embodiment, the switching layer is converted from a switching state having low absorption, i.e. high passage of energy, which exists without voltage, into a switching state having higher absorption, i.e. lower passage of energy. The liquid-crystalline medium is preferably nematic in both states. The voltage-free switching state is preferably characterised in that the molecules of the liquid-crystalline medium, and thus the molecules of the dichroic compound, are aligned perpendicular to the surface of the switching layer (homeotropic orientation). This is preferably achieved by a correspondingly selected orientation layer. The switching state under voltage is preferably characterised in that the molecules of the liquid-crystalline medium, and thus the molecules of the dichroic compound, are parallel to the surface of the switching layer (planar orientation).

In a preferred embodiment of the device, switching layers S(1) and S(2) are the same with respect to their alignment in the voltage-free switching state. The following two cases are conceivable here: in one case, the device can have a planar alignment in both switching layers in the voltage-free switching state, or in another case, the device can have a homeotropic alignment in both switching layers in the voltage-free switching state.

According to an alternative embodiment, which is likewise preferred in certain cases, switching layers S(1) and S(2) are different with respect to their alignment in the voltage-free switching state, for example in such a way that the molecules of the liquid-crystalline medium are homeotropically aligned in one of the switching layers in the voltage-free switching state and have a planar alignment in the other of the two switching layers in the voltage-free switching state.

Furthermore, it is also possible and in certain cases preferred for the switching layers to be different with respect to their alignment in the switching state under voltage, for example in such a way that the molecules of the liquid-crystalline medium are homeotropically aligned in one of the switching layers in the switching state under voltage and have a planar alignment in the other of the two switching layers in the switching state under voltage. This case is preferably combined with the above-mentioned case that switching layers S(1) and S(2) are different with respect to their alignment in the voltage-free switching state.

The following cases are preferred:
Embodiment A-1:
voltage-free dark state: S(1) planar, S(2) planar
voltage only for S(1): S(1) homeotropic, S(2) planar
voltage only for S(2): S(1) planar, S(2) homeotropic
bright state with voltage: S(1) homeotropic, S(2) homeotropic
Embodiment A-2:
voltage-free bright state: S(1) homeotropic, S(2) homeotropic
voltage only for S(1): S(1) planar, S(2) planar
voltage only for S(2): S(1) homeotropic, S(2) planar
dark state with voltage: S(1) planar, S(2) planar
Embodiment A-3:
voltage-free state: S(1) homeotropic, S(2) planar
dark state with voltage only for S(1): S(1) planar, S(2) planar
bright state with voltage only for S(2): S(1) homeotropic, S(2) homeotropic
Embodiment A-4:
voltage-free state: S(1) planar, S(2) homeotropic
bright state with voltage only for S(1): S(1) homeotropic, S(2) homeotropic
dark state with voltage only for S(2): S(1) planar, S(2) planar In embodiments A-3 and A-4, layers S(1) and S(2) are electrically switchable independently of one another. These embodiments have the advantage that a state of medium transmission exists without voltage, from which it is possible to switch into a high-transmission switching state or into a low-transmission switching state in each case only for one of the two switching layers by application of voltage.

It is preferred that separate switching of layers S(1) and S(2) is also possible for embodiments A-1 and A-2. In these embodiments, a switching state of medium transmission is possible by switching from in each case one of the two layers S(1) and S(2).

According to a preferred embodiment, the device according to the invention is characterised in that it generates itself all the energy that is required for switching the switching layer. The device is thus preferably autonomous and does not require any externally supplied energy. To this end, it preferably comprises a device for the conversion of light energy into electrical energy, particularly preferably a solar cell.

In a preferred embodiment of the invention, the said device for the conversion of light energy into electrical energy is electrically connected to the means for electrical switching of the device according to the invention. The provision of the energy by the solar cell can take place directly or indirectly, i.e. via a battery or rechargeable battery or other unit for the storage of energy connected in between. The solar cell is preferably applied to the outside of the device or to the inside of the device, as disclosed, for example, in WO 2009/141295. Preference is given to the use of solar cells which are particularly efficient in the case of diffuse light, and transparent solar cells. For example, it is possible to use silicon solar cells or organic solar cells in the devices according to the invention.

If the device according to the invention comprises a device for the conversion of light energy into electrical energy, it is preferred for this to comprise an optical waveguide system which guides light from the switching layer to the unit which converts light energy into electrical energy.

An optical waveguide system of this type is preferably constructed as described in WO 2009/141295. The optical waveguide system collects and concentrates light hitting the device. It preferably collects and concentrates light emitted by fluorescent dichroic dyes in the switchable layer comprising the liquid-crystalline medium. The optical waveguide system is in contact with a device for the conversion of light energy into electrical energy, preferably a solar cell, so that the collected light hits the latter in concentrated form. The optical waveguide system preferably guides light through total internal reflection. The device is preferably characterised in that the optical waveguide system has at least one wavelength-selective mirror, which is preferably selected from one or more cholesteric liquid-crystal layers.

The device according to the invention is built up from a plurality of layers, which lie flat one on top of the other. It preferably has a layer structure in the following sequence, where the layers are particularly preferably directly adjacent to one another:
- substrate layer, preferably comprising glass or polymer
- electrically conductive transparent layer, preferably ITO layer
- orientation layer O(1)
- switching layer S(1)
- orientation layer O(2)
- electrically conductive transparent layer, preferably ITO layer
- substrate layer(s), preferably comprising glass or polymer
- electrically conductive transparent layer, preferably ITO layer
- orientation layer O(3)
- switching layer S(2)
- orientation layer O(4)
- electrically conductive transparent layer, preferably ITO layer
- substrate layer, preferably comprising glass or polymer.

A layer structure of this type is shown in FIG. 1. Two or more substrate layers may also be present between layers O(2) and O(3), or precisely two substrate layers separated by an interspace.

Layers O(1), S(1) and O(2) preferably follow one another directly. Furthermore, layers O(3), S(2) and O(4) preferably follow one another directly.

In a preferred embodiment, the device according to the invention is a constituent of a window, particularly preferably a window comprising at least one glass surface, very particularly preferably a window which comprises multipane insulating glass.

Window here is taken to mean, in particular, a structure in a building which comprises a frame and at least one glass pane surrounded by this frame. It preferably comprises a heat-insulating frame and two or more glass panes (multipane insulating glass).

According to a preferred embodiment, the device according to the invention is applied directly to a glass surface of a window, particularly preferably in the interspace between two glass panes of multipane insulating glass.

If the device according to the invention is a constituent of a window or a comparable device, it is preferred that the first glass pane of the window is formed by a glass pane of the device, so that the layer sequence of the window comprising the device is as follows:
- glass layer
- electrically conductive transparent layer, preferably ITO layer
- orientation layer O(1)
- switching layer S(1)
- orientation layer O(2)
- electrically conductive transparent layer, preferably ITO layer
- substrate layer, preferably comprising glass or polymer
- electrically conductive transparent layer, preferably ITO layer
- orientation layer O(3)
- switching layer S(2)
- orientation layer O(4)
- electrically conductive transparent layer, preferably ITO layer
- glass layer
- sealed interspace, filled with insulating gas, for example noble gas
- glass layer.

The window is preferably arranged in such a way that the first-mentioned layer is adjacent to the exterior and the last-mentioned layer is adjacent to the interior. However, a reverse arrangement is also possible and may be preferred under certain conditions.

The above-mentioned layer sequence of the window may be supplemented by further layers, such as, for example, additional glass layers or protective layers, for example protective layers against UV radiation, against NIR radiation, against VIS radiation and/or against physical damage, or layers having a reflecting function, for example against NIR light. Individual functions of these layers may also be combined in one layer. Thus, for example, the functions of electrical conductivity and NIR reflection can be achieved by one and the same layer.

A window comprising the device according to the invention can basically also be obtained by retrofitting an existing window.

The present application furthermore relates to a window, preferably having the preferred features indicated above.

In accordance with the invention, orientation axes OA(1)* and OA(2)* of the molecules of the liquid-crystalline medium in at least one switching state are not arranged parallel to one another. For orientation axes OA(1)* and OA(2)*, they preferably form an angle of 50-90°, particularly preferably an angle of 70-90°, and very particularly preferably an angle of 85-90° to one another in this at least one switching state.

According to a preferred embodiment, orientation axis OA(1)* of the molecules of the liquid-crystalline medium is present uniformly throughout switching layer S(1). Analogously, according to a preferred embodiment, orientation axis OA(2)* of the molecules of the liquid-crystalline medium is present uniformly throughout switching layer S(2). However, the case may also occur that orientation axis OA(1)* is only present in the region of switching layer S(1) which is adjacent to orientation layer O(2), and/or that orientation axis OA(2)* is only present in the region of switching layer S(2) which is adjacent to orientation layer O(3). In this case, a twisted arrangement of the orientation axes is preferably present within the switching layer.

The angle between OA(1)* and OA(2)*, i.e. their non-parallelism, is preferably present in a voltage-free switching state of the device, i.e. without application of an electric field. In this case, the angle formed by the orientation axes of the molecules of the liquid-crystalline medium in layers S(1) and S(2) to one another is preferably effected by the orientation layers adjacent to the layer, i.e. by O(1) and O(2) for S(1) and thus OA(1)*, and by O(3) and O(4) for S(2) and thus OA(2)*.

However, the angle may also be present in the switching state under voltage of the device, i.e. under the action of an electric field. In this case, the electric field causes an alignment of the molecules of the liquid-crystalline medium planar to the plane of the switching layer. To this end, it is achieved in accordance with the invention by a defined, differently set pre-tilt angle of orientation layers O(1) and O(2) for S(1) compared with orientation layers O(3) and O(4) for S(2) in the voltage-free switching state, that the molecules of the liquid-crystalline medium are not completely perpendicular to the plane of the switching layer, but instead have a slight angle (pre-tilt angle). If a parallel alignment to the plane of the switching layer is then forced by application of an electric field, the alignment takes place in such a way that the orientation axis continues to be present in a plane with the orientation axis, as was present in the homeotropic state in the presence of the pre-tilt angle. Orientation layers O(1) and O(2) for S(1) and orientation layers O(3) and O(4) for S(2) thus indirectly specify orientation axes OA(1)* and OA(2)* respectively in this embodiment too.

In a further alternative, it is possible for the angle between OA(1)* and OA(2)* to be present in a switching state in which one of the two switching layers is in the voltage-free switching state and the other of the two switching layers is in the switching state under voltage.

Orientation layers O(2) and O(3) in the device are preferably designed in such a way that they each effect different orientation axes of the molecules of the liquid-crystalline medium which is adjacent to the orientation layer.

They preferably effect this orientation in precisely one of two possible switching states. This switching state is preferably the voltage-free switching state of the device. Furthermore, the liquid-crystalline medium in this state is preferably present in a liquid-crystalline phase, preferably a nematic liquid-crystalline phase.

Layers O(2) and O(3) in the voltage-free switching state preferably effect a planar alignment of the molecules of the adjacent liquid-crystalline medium. In accordance with the general definition in the art, planar alignment is taken to mean that the longest axis of the molecules of the liquid-crystalline medium is parallel to the plane of the orientation layer.

Alternatively, however, it is also possible for layers O(2) and O(3) in the voltage-free switching state to effect a homeotropic alignment of the molecules of the adjacent liquid-crystalline medium. In accordance with the general definition in the art, homeotropic alignment is taken to mean that the longest axis of the molecules of the liquid-crystalline medium is perpendicular to the plane of the orientation layer.

Furthermore, the case is also possible that one of the two orientation layers O(2) and O(3) effects a homeotropic alignment of the molecules of the adjacent liquid-crystalline medium and the other of the two orientation layers O(2) and O(3) effects a planar alignment of the molecules of the adjacent liquid-crystalline medium.

Particularly preferred variants of embodiment A-1, as presented above, are described in greater detail below:

Preference is given to the alignment which is effected by layers O(2) and O(3) in such a way that the orientation axes of the molecules of the liquid-crystalline medium which is adjacent to the corresponding layer are in each case twisted with respect to one another by an angle of 50-90°, particularly preferably by an angle of 70-90°, and very particularly preferably by an angle of 85-90°. A particularly preferred arrangement of this type is shown in FIG. 2, where the orientation axes of the molecules of the respective liquid-crystalline medium adjacent to the orientation layers are denoted by double arrows.

The double arrows take into account the circumstance that the orientation axes do not have a direction. Thus, angles greater than 90° have their equivalent counterparts in angles less than 90°.

Angles of greater than 90° between the orientation axes are not possible in accordance with the definition, since no distinction is made between the two ends of the arrows, corresponding to the situation in the case of the molecules of the liquid-crystalline medium, for which a distinction is only made between one longitudinal and two transverse axes.

In a preferred embodiment of the invention, A-1-1, the two orientation layers which bound the same switching layer are each designed in such a way that they essentially effect the same orientation axis of the molecules of the liquid-crystalline medium of the switching layer. A preferred arrangement of this type thus effects the following approximate angles of the orientation axes, beginning at 0° for O(1):

O(1): 0°
O(2): 0°
O(3): 90°
O(4): 90°

An arrangement of this type is shown diagrammatically in FIG. 3 analogously to FIG. 2. In the case shown, the angle of OA(1)* is 0° and that of OA(2) is 90°, so that they enclose an angle of 90°.

In an alternative, likewise preferred embodiment of the invention, the two orientation layers which bound the same switching layer are designed in such a way that the orientation axes, effected by them, of the molecules of the liquid-crystalline medium are twisted with respect to one another. They preferably form an angle of 50-90°, particularly preferably an angle of 70-90°, and very particularly preferably an angle of 85-90° to one another.

This is particularly preferably combined with the above-mentioned preference relating to the angle of the orientation axes effected by O(2) and O(3). A preferred arrangement of this type, A-1-2, thus effects the following approximate angles of the orientation axes, beginning at 0° for O(1):

O(1): 0°
O(2): 90°
O(3): 0°
O(4): 90°

An arrangement of this type is shown diagrammatically in FIG. 4 analogously to FIG. 2. In the case shown, the angle of OA(1)* is 90° and that of OA(2) is 0°, so that they enclose an angle of 90°.

It is pointed out that angles of similar size, for example 80°, can also be employed instead of the twist angle of 90°.

Furthermore, an embodiment is also possible and preferred in which O(1) and O(2) effect a twist of 90°, but O(3) and O(4) effect no twist. A preferred arrangement of this type, A-1-3, thus effects the following approximate angles of the orientation axes, beginning at 0° for O(1):

O(1): 0°
O(2): 90°
O(3): 0°
O(4): 0°

An arrangement of this type is shown diagrammatically in FIG. 5 analogously to FIG. 2. In the case shown, the angle of OA(1)* is 90° and that of OA(2) is 0°, so that they enclose an angle of 90°.

It is pointed out that angles of similar size, for example 80°, can also be employed instead of the twist angle of 90°.

Finally, an embodiment is also possible and preferred in which O(3) and O(4) effect a twist of 90°, but O(1) and O(2) effect no twist. A preferred arrangement of this type, A-1-4, thus effects the following approximate angles of the orientation axes, beginning at 0° for O(1):
O(1): 0°
O(2): 0°
O(3): 90°
O(4): 0°

An arrangement of this type is shown diagrammatically in FIG. 6 analogously to FIG. 2. In the case shown, the angle of OA(1)* is 0° and that of OA(2) is 90°, so that they enclose an angle of 90°.

It is pointed out that angles of similar size, for example 80°, can also be employed instead of the twist angle of 90°.

The molecules of the one or more dichroic compounds in the switching layer are preferably basically aligned in the same way as the molecules of the liquid-crystalline medium. The person skilled in the art knows how to select the liquid-crystalline medium and the dichroic compounds in order that this same alignment takes place.

In the switching state with application of voltage, the molecules of the liquid-crystalline medium are preferably aligned substantially perpendicular to the plane of the layers. The person skilled in the art knows how to apply the voltage, depending on liquid-crystalline medium selected, in order to achieve this.

It is also possible, starting from a dark state of the device as described above, to achieve a relatively brighter switching state by transition into an isotropic state of the molecules of the liquid-crystalline medium of the switching layer, as described, for example, in US 2010/0259698. Application of electrical voltage is not necessary here.

For the pair of orientation layers O(1) and O(2), it is preferred for either both orientation layers to effect a planar alignment of the molecules of the liquid-crystalline medium, or for both to effect a homeotropic alignment of the molecules of the liquid-crystalline medium. Particularly preferably, both orientation layers effect exactly the same orientation axis of the molecules of the liquid-crystalline medium of layer S(1) which are adjacent to the orientation layer. However, the case may also occur that both orientation layers effect different orientation axes. This causes the formation of a twisted arrangement of the orientation axes within switching layer S(1).

For the pair of orientation layers O(3) and O(4), it is preferred for either both orientation layers to effect a planar alignment of the molecules of the liquid-crystalline medium, or for both to effect a homeotropic alignment of the molecules of the liquid-crystalline medium. Particularly preferably, both orientation layers effect exactly the same orientation axis of the molecules of the liquid-crystalline medium of layer S(2) which are adjacent to the orientation layer. However, the case may also occur that both orientation layers effect different orientation axes. This causes the formation of a twisted arrangement of the orientation axes within switching layer S(2).

The orientation layers used in the device according to the invention can be any desired layers known to the person skilled in the art for this purpose. Preference is given to polyimide layers, particularly preferably layers comprising rubbed polyimide. Polyimide rubbed in a certain manner known to the person skilled in the art results in alignment of the molecules of the liquid-crystalline medium in the rubbing direction if the molecules are parallel to the orientation layer (planar alignment). It is preferred here for the molecules of the liquid-crystalline medium not to be completely planar on the orientation layer, but instead to have a slight pretilt angle. In order to achieve vertical alignment of the compounds of the liquid-crystalline medium to the surface of the orientation layer (homeotropic alignment), polyimide treated in a certain manner is preferably employed as material for the orientation layer (polyimide for very high pretilt angles). Furthermore, polymers obtained by an exposure process to polarised light can be used as orientation layer in order to achieve alignment of the compounds of the liquid-crystalline medium in accordance with an orientation axis (photoalignment).

The preferred features of switching layers indicated below preferably apply both to switching layer S(1) and also to switching layer S(2).

It is furthermore generally preferred for switching layers S(1) and S(2) to have the same structure with respect to their chemical composition, and for them to have the same physical properties.

Switching layers S(1) and S(2) are preferably characterised in that they have a degree of anisotropy R of 0.7 to 0.9, particularly preferably 0.7 to 0.85, and very particularly preferably 0.75 to 0.8.

The degree of anisotropy R of a switching layer is calculated from the measured values for the absorbance in the case of alignment of the molecules parallel to the plane of vibration of the polarised light (E(p)) and from the measured values for the absorbance in the case of alignment of the molecules perpendicular to the plane of vibration of the polarised light (E(s)) in accordance with the formula $R=[E(p)-E(s)]/[E(p)+2*E(s)]$. The precise method to be used is indicated in the working examples.

Furthermore, the switching layer preferably has a degree of light transmission in the bright state $\tau_{v\ bright}$ of at least 40%, preferably at least 50%, particularly preferably at least 60% and very particularly preferably at least 70%.

The degree of light transmission in the bright state $\tau_{v\ bright}$ of the switching layer is quoted in percent. It is calculated from the ratio of the degree of light transmission of the switching layer in the bright state of the device relative to a device with a switching layer without dye as reference. It is determined in accordance with European Standard EN410, equation (1) (Determination of the luminous and solar characteristics of glazing) from the spectral degrees of transmission taking into account the relative spectral distribution of the standard illuminant and the spectral degree of brightness sensitivity of the standard observer. The precise method to be used is indicated in the working examples.

The switching layer preferably has a thickness between 1 and 100 μm, particularly preferably between 5 and 50 μm. It is furthermore preferred for switching layers S(1) and S(2) to have the same thickness.

The device is preferably characterised in that the switching layers comprise three or more different dichroic compounds.

It is furthermore preferred for at least one of the dichroic compounds to be luminescent, preferably fluorescent. This is particularly preferred if the light energy absorbed by the compounds is to be re-emitted, for example in order to be utilised for energy recovery by means of a solar cell.

Fluorescence here is taken to mean that a compound is placed in an electronically excited state by absorption of light of a certain wavelength, where the compound subsequently undergoes a transition into the ground state with emission of light. The emitted light preferably has a longer wavelength than the absorbed light. The transition from the excited state into the ground state is furthermore preferably spin-allowed, i.e. takes place without a change in the spin. Furthermore, the lifetime of the excited state of the fluorescent compound is preferably shorter than $10^{-5}$ s, particularly preferably shorter than $10^{-6}$ s, very particularly preferably between $10^{-9}$ and $10^{-7}$ s.

According to an alternative embodiment, which may likewise be preferred under certain conditions, the dichroic compounds are not fluorescent.

selected from azo dyes, perylenes, terrylenes, benzothiadiazoles and diketopyrrolopyrroles.

Preferred squaraine dyes conform to the following formula (I), and preferred boron-dipyrromethene dyes conform to the following formula (II)

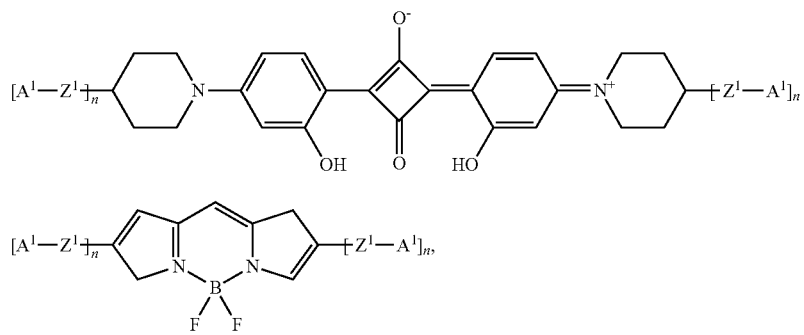

formula (I)

formula (II)

The absorption spectra of the dichroic dyes in the liquid-crystalline medium preferably complement one another in such a way that the impression of a black colour arises for the eye. The two or more dichroic dyes of the liquid-crystalline medium preferably cover a large part of the visible spectrum. This is preferably achieved through at least one dichroic dye absorbing red light, at least one absorbing green to yellow light and at least one absorbing blue light.

The precise way in which a mixture of dyes which appears black or grey to the eye can be prepared is known to the person skilled in the art and is described, for example, in Manfred Richter, Einführung in die Farbmetrik [Introduction to Colorimetry], 2nd Edition, 1981, ISBN 3-11-008209-8, Verlag Walter de Gruyter & Co.

The dichroic dyes furthermore preferably absorb predominantly light in the UV-VIS-NIR region, i.e. in a wavelength range from 320 to 2000 nm. UV light, VIS light and NIR light here are as defined above. The dichroic dyes particularly preferably have absorption maxima in the range from 400 to 1300 nm.

The proportion of all dichroic dyes together in the liquid-crystalline medium is preferably in total 0.01 to 10% by weight, particularly preferably 0.1 to 7% by weight and very particularly preferably 0.2 to 7% by weight. The proportion of an individual dichroic dye is preferably 0.01 to 10% by weight, preferably 0.05 to 7% by weight and very particularly preferably 0.1 to 7% by weight.

The dichroic dyes are furthermore preferably selected from the dye classes indicated in B. Bahadur, Liquid Crystals—Applications and Uses, Vol. 3, 1992, World Scientific Publishing, Section 11.2.1, and particularly preferably from the explicit compounds given in the table present therein.

Preferably, at least one dichroic compound, particularly preferably all dichroic compounds, is selected from azo compounds, anthraquinones, methine compounds, azomethine compounds, merocyanine compounds, naphthoquinones, tetrazines, perylenes, terrylenes, quaterrylenes, higher rylenes, benzothiadiazoles, diketopyrrolopyrroles, squaraines and pyrromethenes, for example boron-dipyrromethenes (BODIPYs).

Particularly preferably at least one dichroic compounds, very particularly preferably all dichroic compounds, is (are)

where $A^1$ is on each occurrence, identically or differently, an aliphatic, heteroaliphatic, aromatic or heteroaromatic ring, which may be substituted by one or more radicals $R^1$;

$Z^1$ is selected on each occurrence, identically or differently, from a single bond, —C(=O)—O—, —O—(C=O)—, O, S, —CF$_2$—CF$_2$—, —CF$_2$—O—, —O—CF$_2$—, —CH$_2$—CH$_2$—, —CH=CH—, —CF=CF—, —CF=CH—, —CH=CF—, —C≡C—, —OCH$_2$— and —CH$_2$O—;

$R^1$ is on each occurrence, identically or differently, any desired organic radical; and n is on each occurrence, identically or differently, 1, 2, 3, 4 or 5; and the structures of the formulae (I) and (II) may be substituted at any free position by radicals $R^1$ in each case.

$A^1$ is preferably on each occurrence, identically or differently, optionally substituted 1,4-cyclohexylene or 1,4-phenylene.

The index n is preferably on each occurrence, identically or differently, 1, 2 or 3.

$R^1$ is preferably on each occurrence, identically or differently, H, D, F, Cl, CN, $R^2$—O—CO—, $R^2$—CO—O—, or an alkyl or alkoxy group having 1 to 10 C atoms, or an alkenyl group having 2 to 10 C atoms, where $R^2$ is an alkyl group having 1 to 10 C atoms or an aryl or heteroaryl group having 5 to 20 C atoms.

Anthraquinone dyes are described, for example, in EP 34832, EP 44893, EP 48583, EP 54217, EP 56492, EP 59036, GB 2065158, GB 2065695, GB 2081736, GB 2082196, GB 2094822, GB 2094825, JP-A 55-123673, DE 3017877, DE 3040102, DE 3115147, DE 3115762, DE 3150803 and DE 3201120, naphthoquinone dyes are described, for example, in DE 3126108 and DE 3202761, azo dyes in EP 43904, DE 3123519, WO 82/2054, GB 2079770, JP-A 56-57850, JP-A 56-104984, U.S. Pat. No. 4,308,161, U.S. Pat. No. 4,308,162, U.S. Pat. No. 4,340,973, T. Uchida, C. Shishido, H. Seki and M. Wada: Mol. Cryst. Liq. Cryst. 39, 39-52 (1977), and H. Seki, C. Shishido, S. Yasui and T. Uchida: Jpn. J. Appl. Phys. 21, 191-192 (1982), perylenes in EP 60895, EP 68427 and WO 82/1191, boron-dipyrromethenes in A. Loudet et al., Chem. Rev. 2007, 4891-4932, and squaraines in K. Law et al., Chem. Rev. 1993, 449-486.

Very particular preference is given to rylene dyes, as disclosed, for example, in EP 2166040, US 2011/0042651, EP 68427, EP 47027, EP 60895, DE 3110960 and EP 698649.

Very particular preference is furthermore given to benzothiadiazoles, as disclosed, for example, in the as yet unpublished application EP 13002711.3.

Very particular preference is furthermore given to diketopyrrolopyrroles, as disclosed, for example, in the as yet unpublished application EP 13005918.1.

Examples of preferred dichroic dyes which may be present in the liquid-crystalline medium are depicted in the following table.

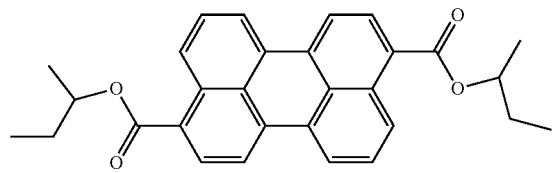 [SMILES: CCC(C)OC(=O)c1ccc2c3cccc4c(C(=O)OC(C)CC)ccc(c5cccc1c52)c43]

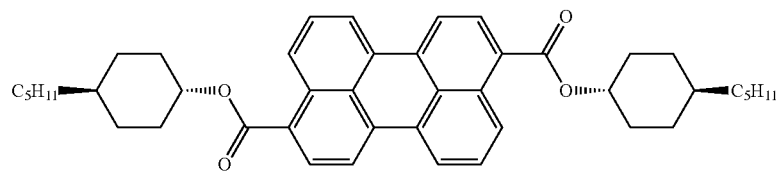

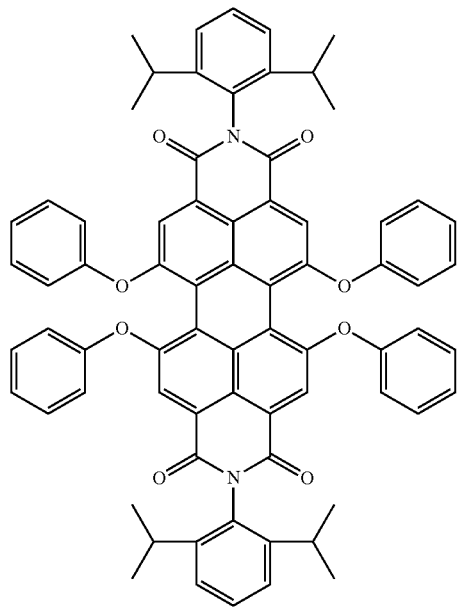 [SMILES: CC(C)c1cccc(C(C)C)c1N1C(=O)c2cc(Oc3ccccc3)c3c4c(Oc5ccccc5)cc5c6c(cc(Oc7ccccc7)c(c7c(Oc8ccccc8)cc(c2c37)C1=O)c64)C(=O)N(c1c(C(C)C)cccc1C(C)C)C5=O]

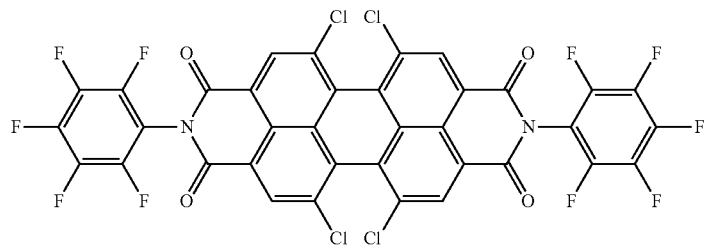 [SMILES: O=C1c2cc(Cl)c3c4c(Cl)cc5c6c(cc(Cl)c(c7c(Cl)cc(c2c37)C(=O)N1c1c(F)c(F)c(F)c(F)c1F)c64)C(=O)N(c1c(F)c(F)c(F)c(F)c1F)C5=O]

-continued
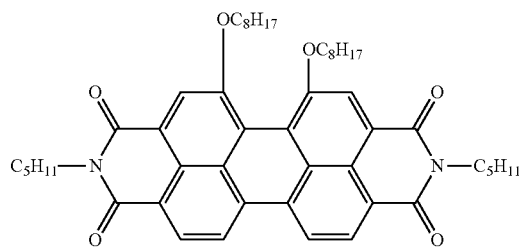
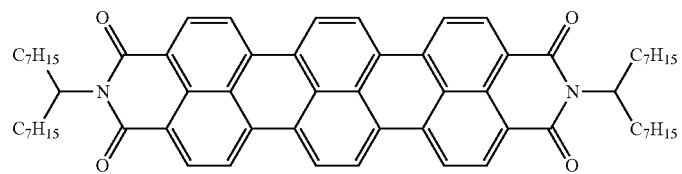
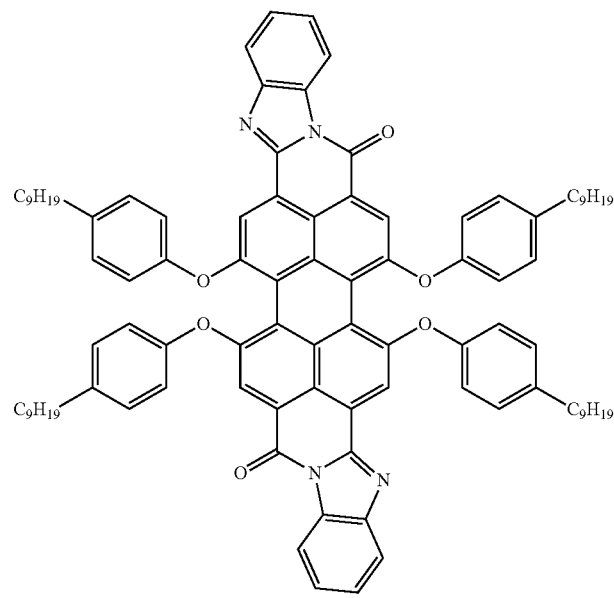
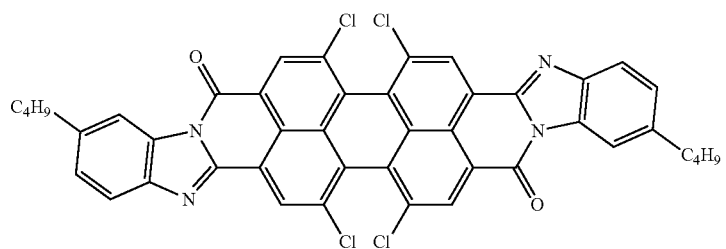
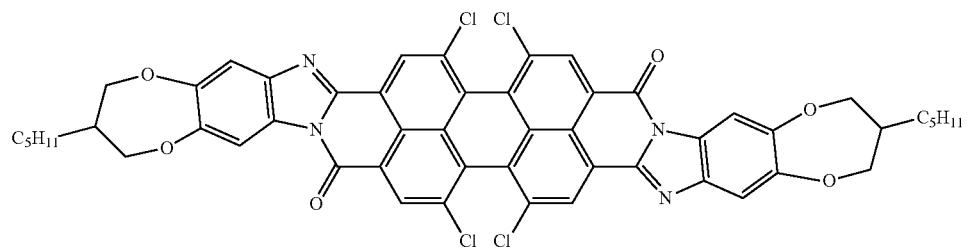

-continued
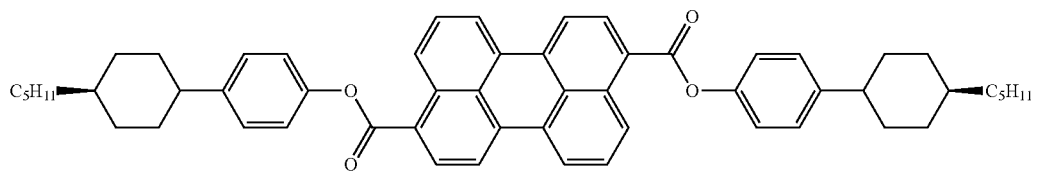
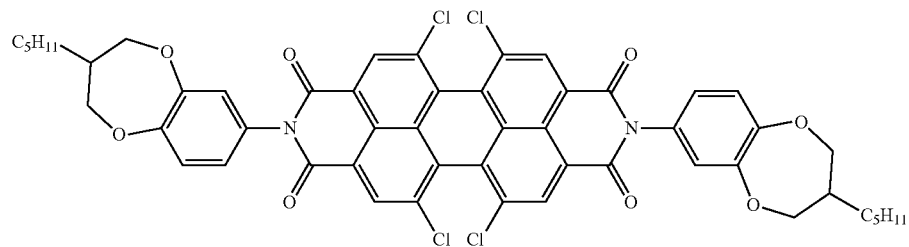
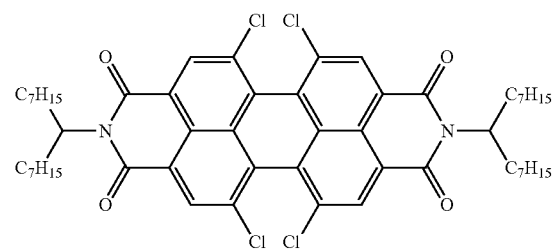
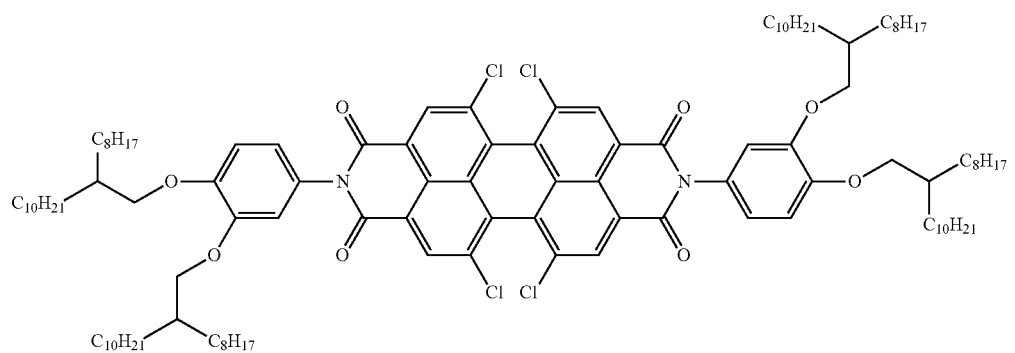
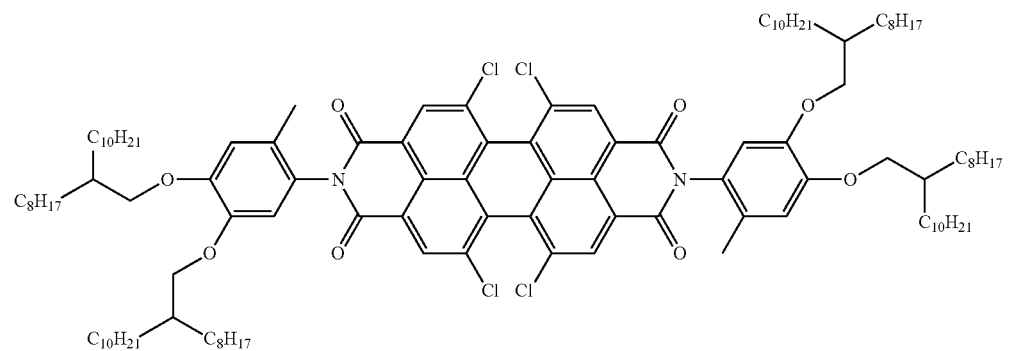

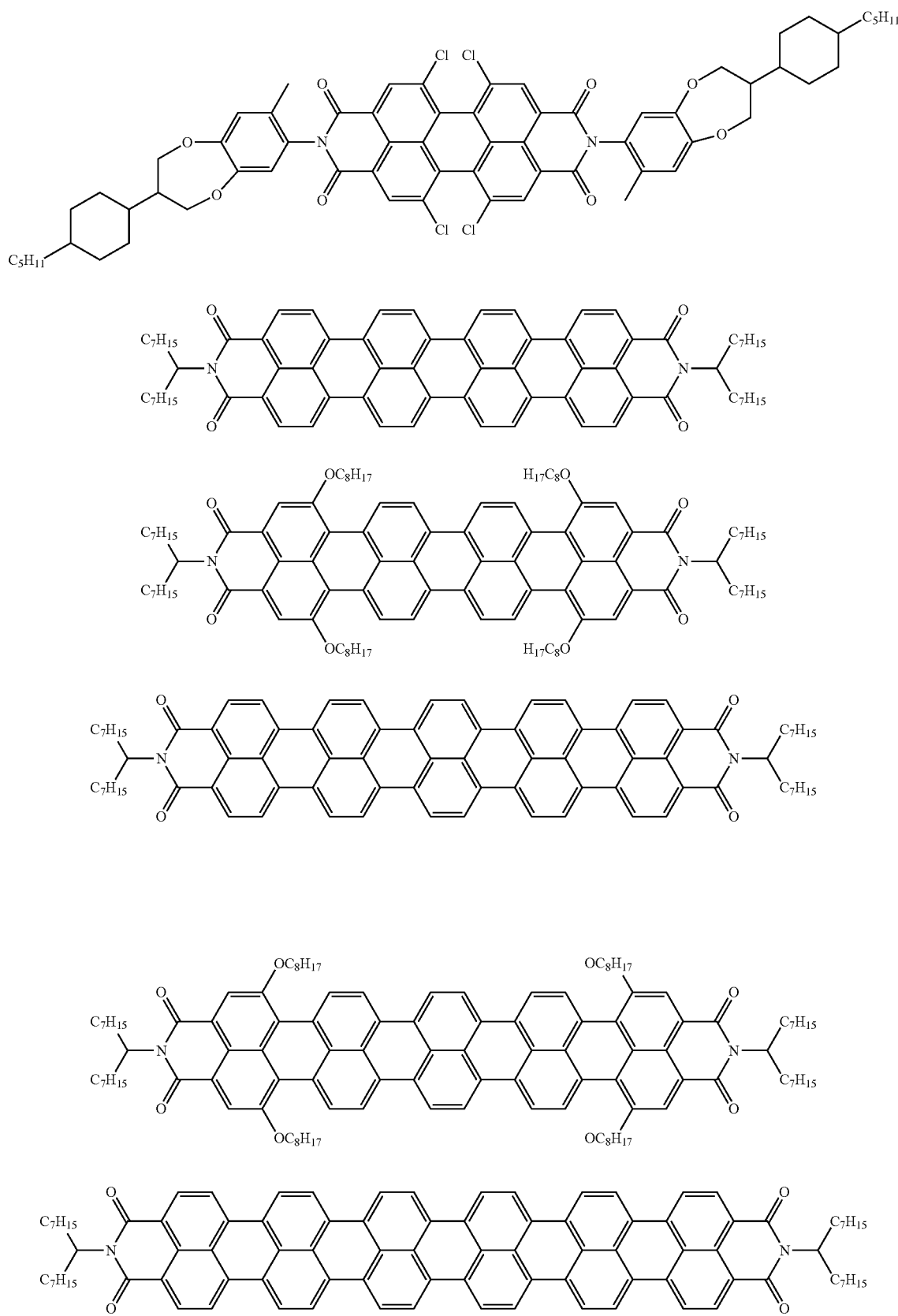

-continued
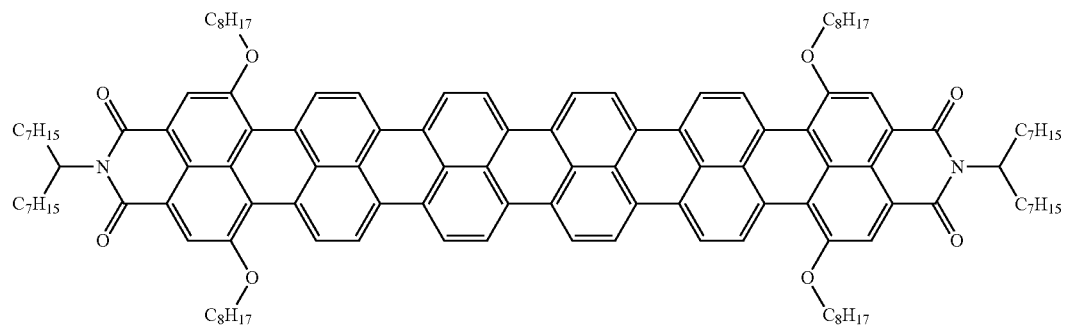
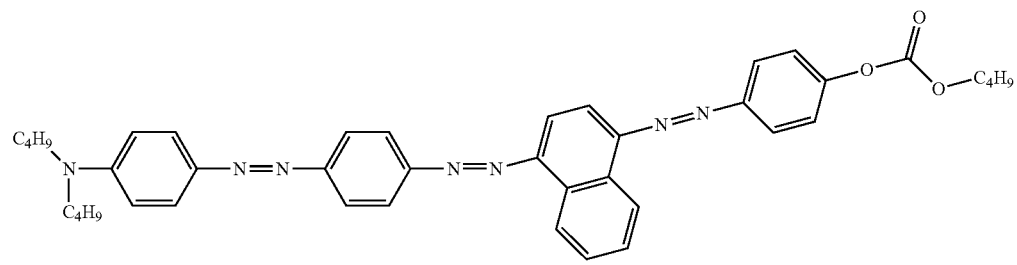
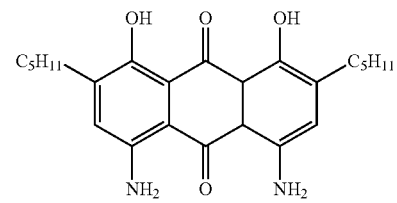
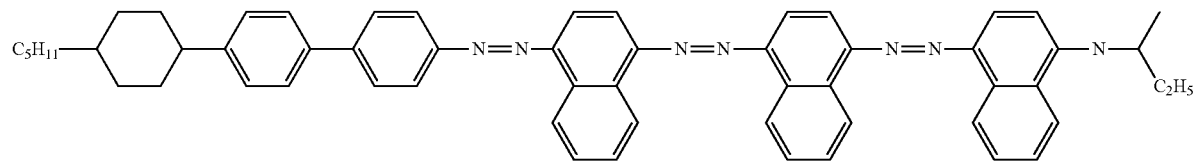
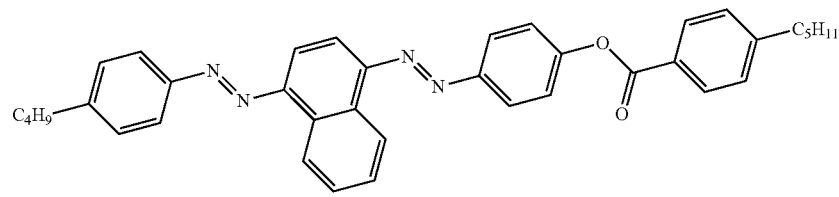
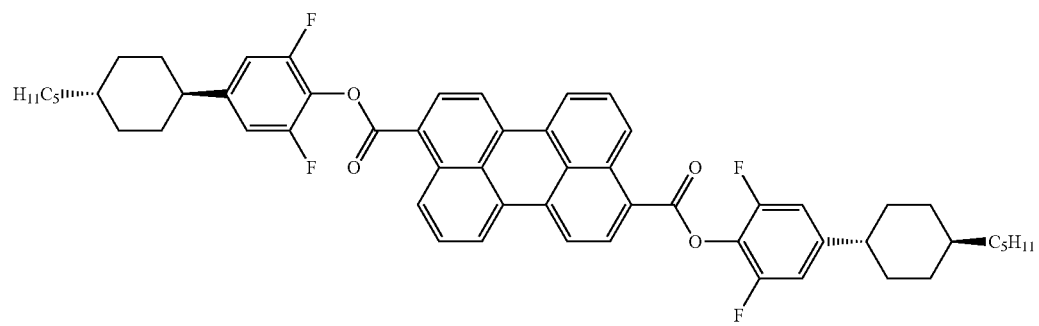

-continued
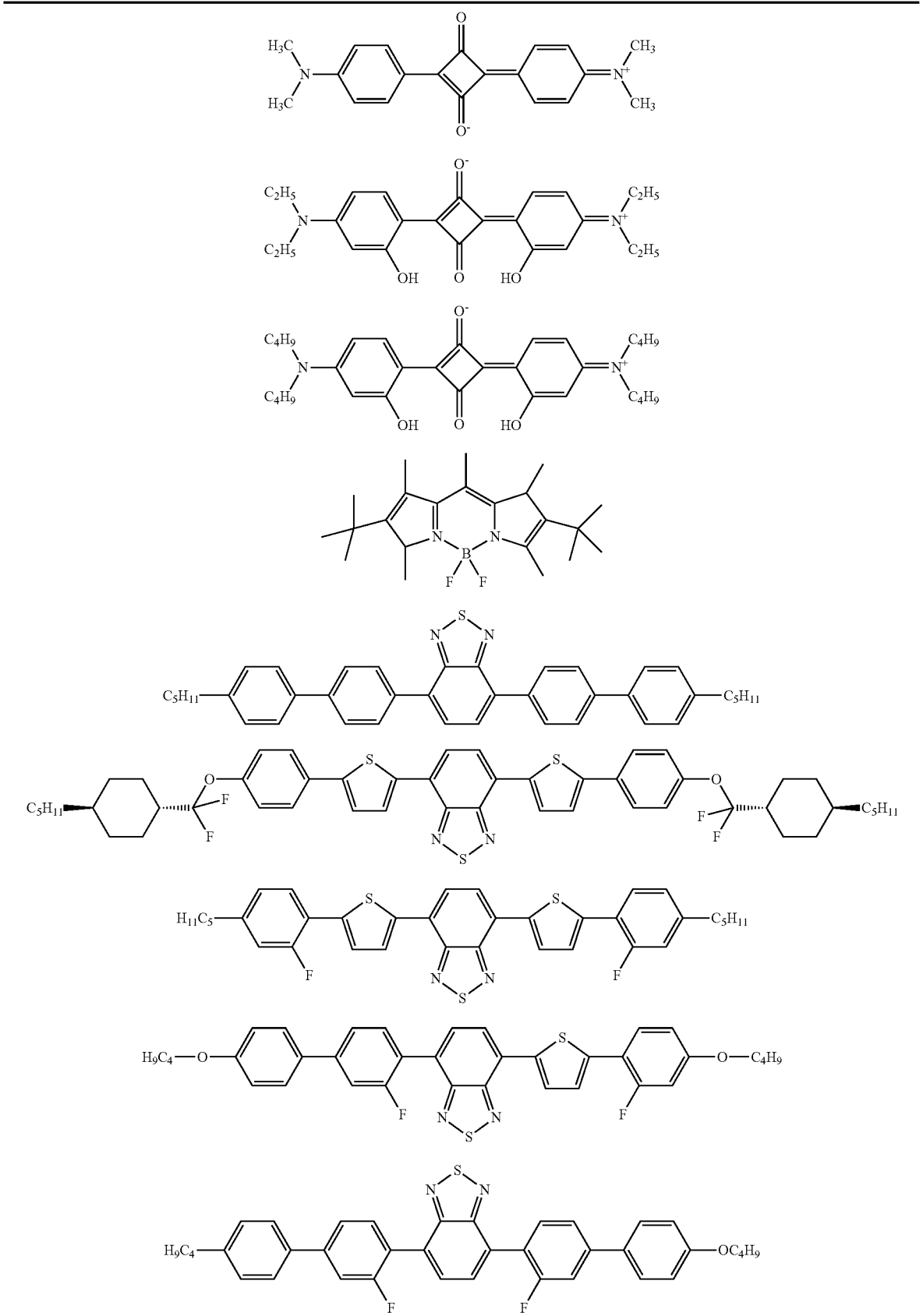

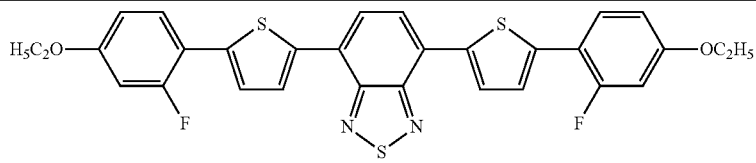
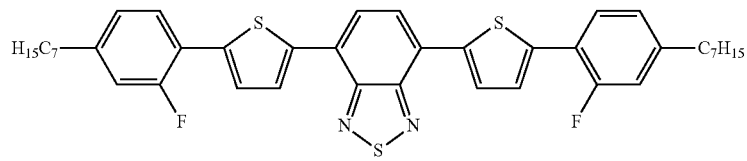
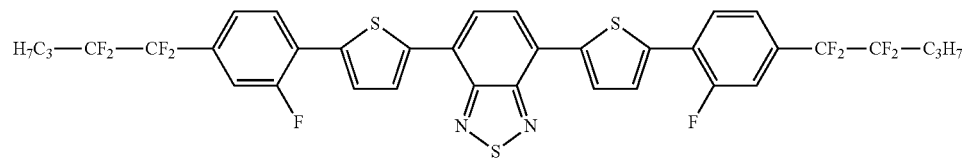
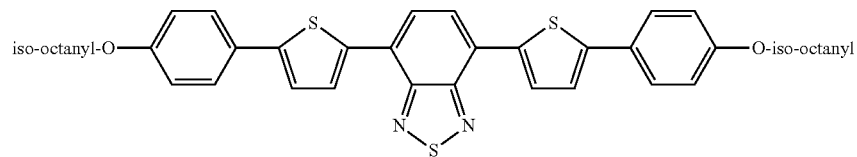
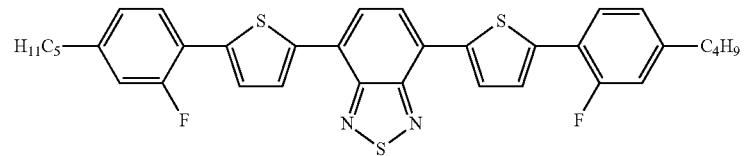
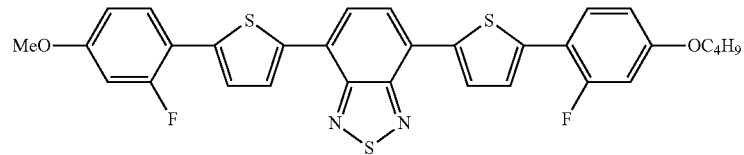
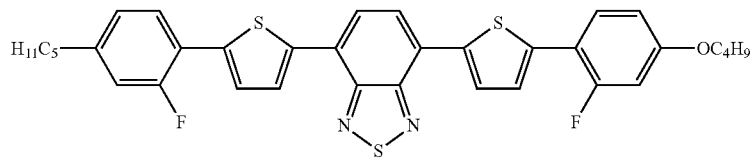
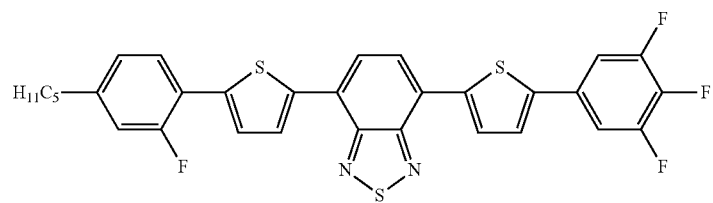
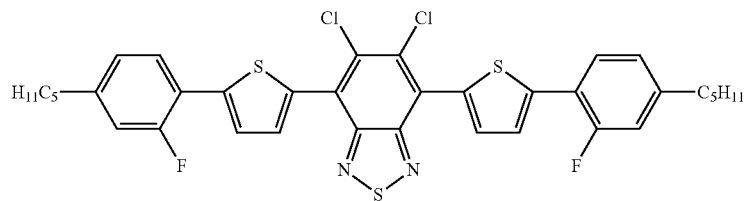

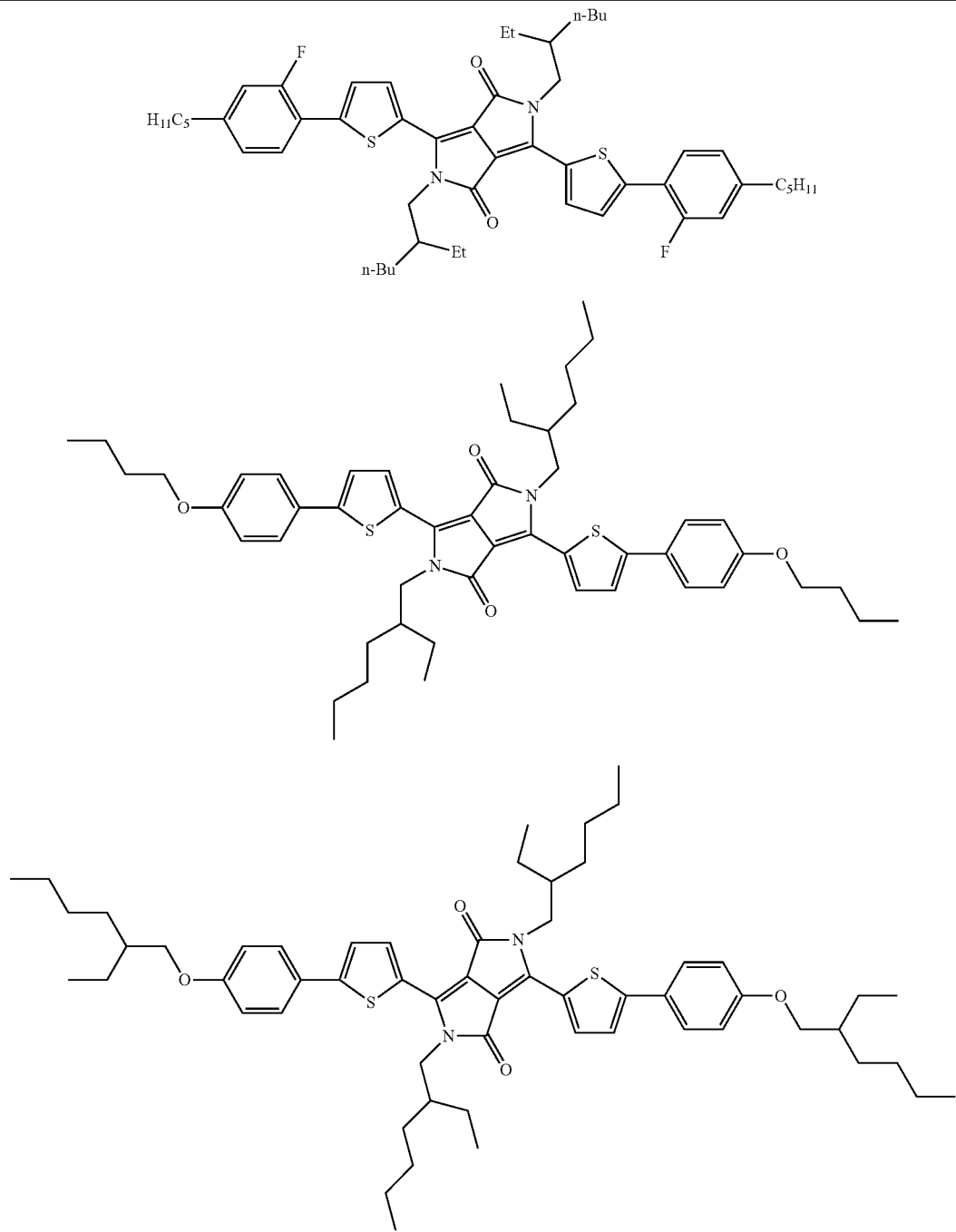

In accordance with the invention, the switching layer of the device comprises a liquid-crystalline medium.

The liquid-crystalline medium is preferably nematically liquid-crystalline at the operating temperature of the device. It is particularly preferably nematically liquid-crystalline in a range of +−20° C., very particularly preferably in a range of +−30° C. above and below the operating temperature of the device.

The liquid-crystalline medium furthermore preferably has a clearing point, preferably a phase transition from a nematically liquid-crystalline state to an isotropic state, in the temperature range from 70° C. to 170° C., preferably from 90° C. to 160° C., particularly preferably from 95° C. to 150° C. and very particularly preferably from 105° C. to 140° C.

Furthermore, the dielectric anisotropy $\Delta\epsilon$ of the liquid-crystalline medium is preferably greater than 3, particularly preferably greater than 7.

Alternatively, it may be preferred for the dielectric anisotropy $\Delta\epsilon$ of the liquid-crystalline medium to be less than −2, preferably less than −3.

The liquid-crystalline medium furthermore preferably comprises 3 to 20 different compounds, preferably 8 to 18, particularly preferably 10 to 16 different compounds.

The liquid-crystalline medium furthermore preferably has an optical anisotropy (Δn) of 0.01 to 0.3, particularly preferably 0.04 to 0.27.

The liquid-crystalline medium furthermore preferably has a specific electrical resistance of greater than $10^{10}$ ohm*cm.

Compounds which can be used as constituents of the liquid-crystalline medium are known to the person skilled in the art and can be selected freely.

It is furthermore preferred for the liquid-crystalline medium to comprise at least one compound which contains structural elements based on 1,4-phenylenes and 1,4-cyclohexylenes. It is particularly preferred for the liquid-crystalline medium of the switching layer to comprise at least one compound which contains 2, 3 or 4, particularly preferably 3 or 4 structural elements based on 1,4-phenylenes and 1,4-cyclohexylenes.

The liquid-crystalline medium may comprise one or more chiral dopants. These are then preferably present in a total concentration of 0.01 to 3% by weight, particularly preferably 0.05 to 1% by weight. In order to obtain high values for the twist, the total concentration of the chiral dopants may also be selected higher than 3% by weight, preferably up to a maximum of 10% by weight.

The liquid-crystalline medium preferably comprises one or more stabilisers. The total concentration of the stabilisers is preferably between 0.00001 and 10% by weight, particularly preferably between 0.0001 and 1% by weight of the entire mixture.

The device is preferably characterised in that it does not comprise a polymer-based polariser, particularly preferably does not comprise a polariser in the solid material phase and very particularly preferably comprises no polariser at all.

However, in accordance with an alternative embodiment, the device may also comprise one or more polarisers. In this case, linear polarisers are preferred.

If precisely one polariser is present, its absorption direction is preferably perpendicular to the orientation axis of the compounds of the liquid-crystalline medium of the device according to the invention on the side of the switching layer on which the polariser is located.

In the device according to the invention, both absorptive and also reflective polarisers can be employed. Preference is given to the use of polarisers which are in the form of thin optical films. Examples of reflective polarisers which can be used in the device according to the invention are DRPF (diffusive reflective polariser film, 3M), DBEF (dual brightness enhanced film, 3M), DBR (layered-polymer distributed Bragg reflectors, as described in U.S. Pat. No. 7,038,745 and U.S. Pat. No. 6,099,758) and APF films (advanced polariser film, 3M, cf. Technical Digest SID 2006, 45.1, US 2011/0043732 and U.S. Pat. No. 7,023,602). It is furthermore possible to employ polarisers based on wire grids (WGPs, wire-grid polarisers) which reflect infrared light. Examples of absorptive polarisers which can be employed in the devices according to the invention are the Itos XP38 polariser film and the Nitto Denko GU1220DUN polariser film. An example of a circular polariser which can be used in accordance with the invention is the APNCP37-035-STD polariser (American Polarizers). A further example is the CP42 polariser (ITOS).

The device may furthermore comprise protective layers, for example protective layers against UV radiation, against NIR radiation, against VIS radiation and/or against physical damage.

Instead of the above-mentioned materials glass and polymer for the substrate layers, other materials having similar properties can also be employed. Preferred materials of the substrate layer are glass or the polymers PET, PEN, PVB or PMMA.

It is furthermore preferred for the device according to the invention to comprise one or more glass layers which have an antireflection coating. Antireflection coatings are produced by coating methods of thin-film technology. These include, for example, physical gas-phase deposition, such as thermal evaporation and sputter deposition. The antireflection coating can be achieved by a single-layer system or by a multilayer system. At least the glass layer which is adjacent to the outside environment, i.e. is exposed directly to the incident sunlight, preferably has an antireflection coating in the device according to the invention.

DESCRIPTION OF THE REFERENCE NUMERALS

Figure 1:
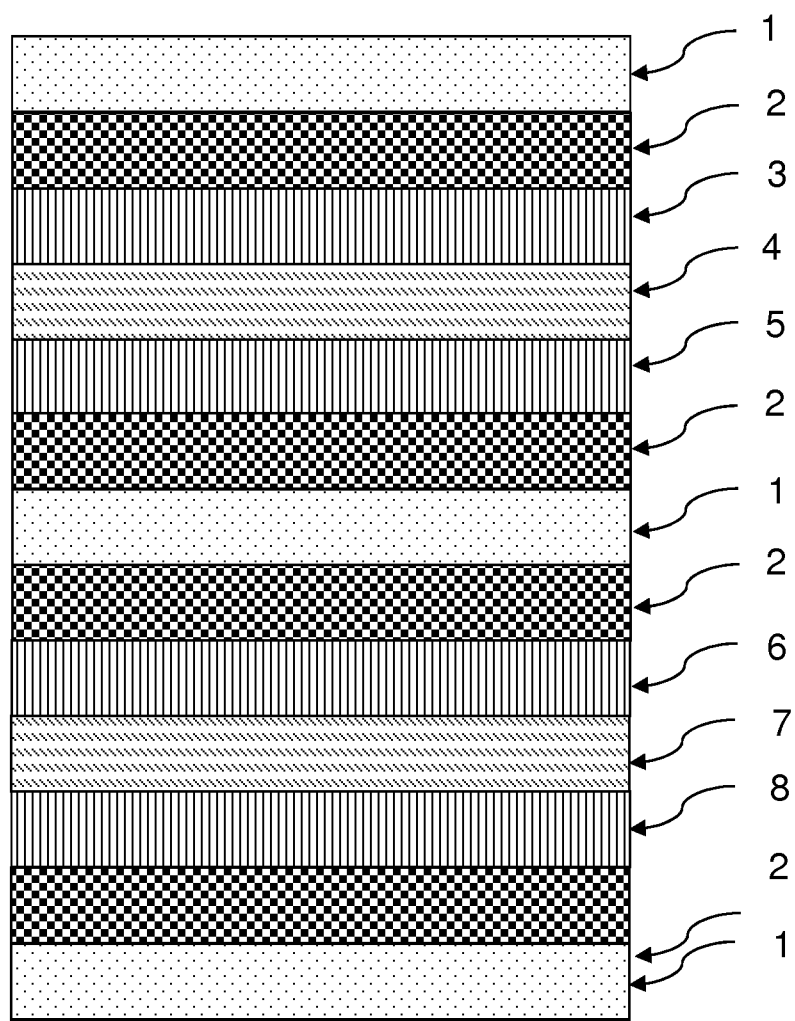
FIG. 1 shows a preferred layer sequence of a device according to the invention.
Figure 2:
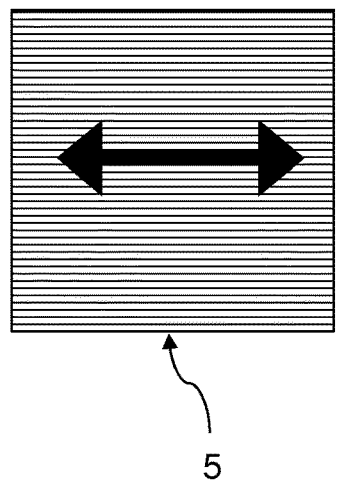
FIG. 2 shows, for a preferred embodiment of the device, the different orientation axis of the molecules of the liquid-crystalline medium directly adjacent to orientation layers O(2) and O(3) by means of double arrows.
Figure 2:
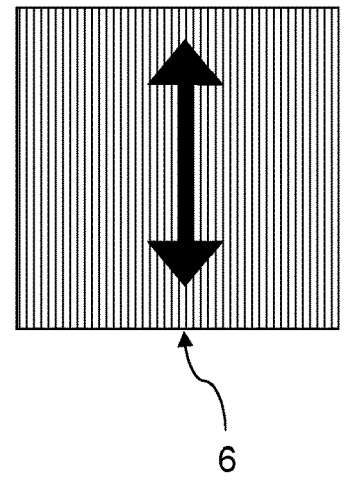
Figure 3:
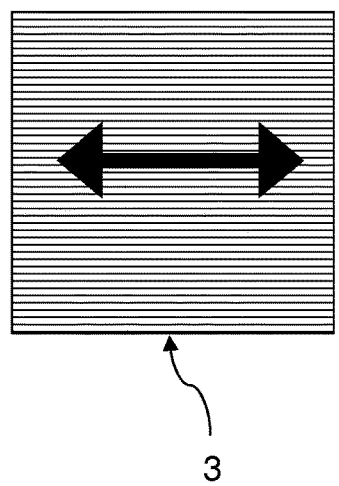
FIG. 3 shows, for a preferred embodiment of the device, A-1-1, the different orientation axis of the molecules of the liquid-crystalline medium directly adjacent to orientation layers O(1), O(2), O(3) and O(4) by means of double arrows, where the orientation axes are in each case the same for O(1) and O(2) and are in each case the same for O(3) and O(4).
Figure 3:
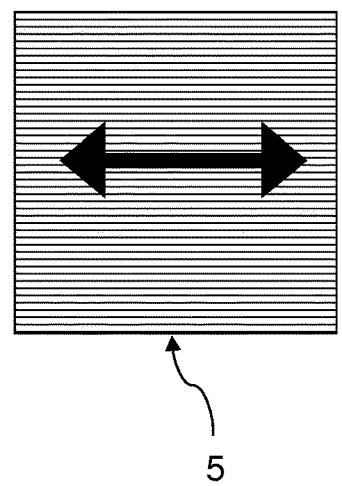
Figure 3:
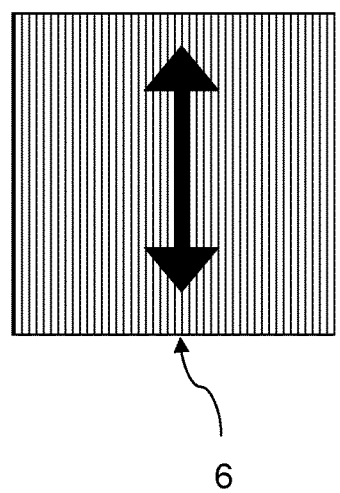
Figure 3:
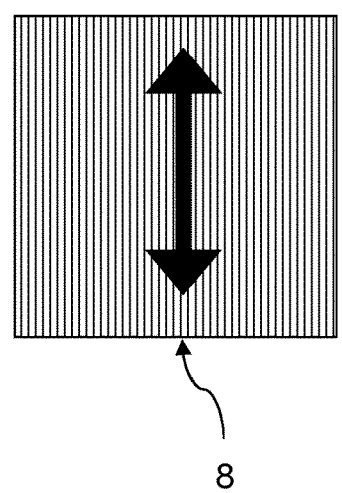
Figure 4:
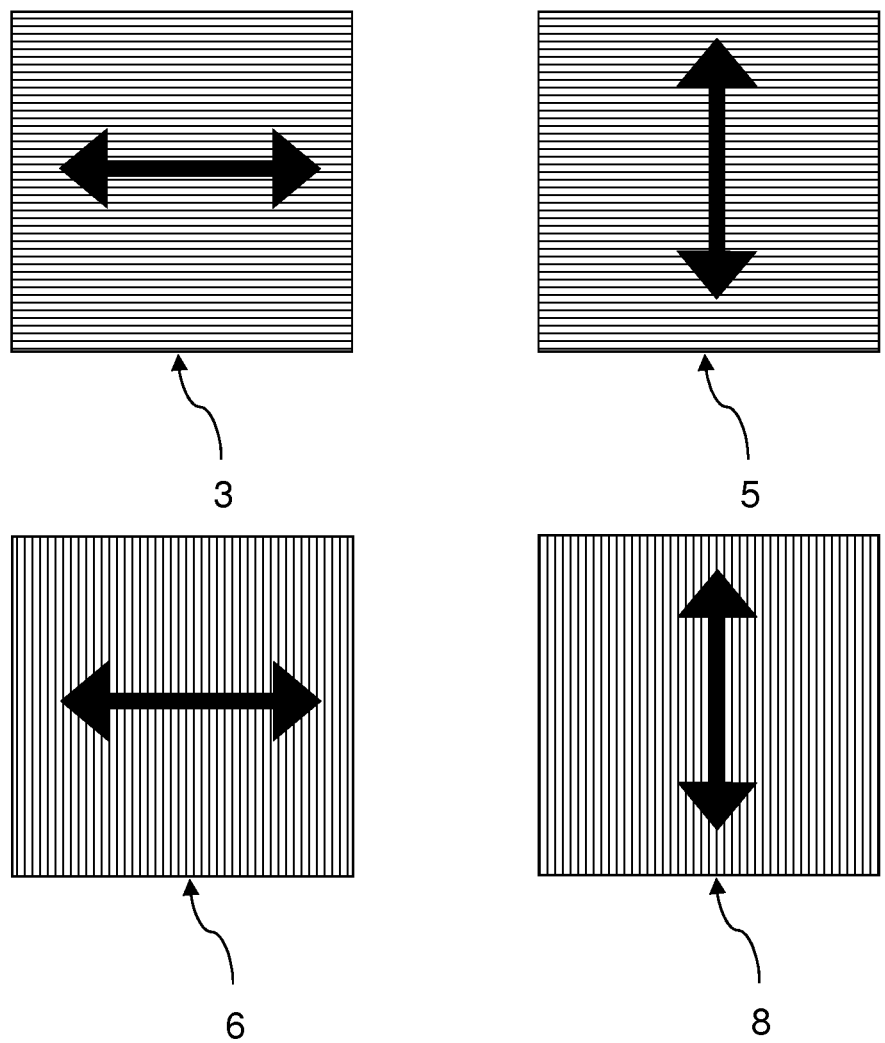
FIG. 4 shows, for a preferred embodiment of the device, A-1-2, the different orientation axis of the molecules of the liquid-crystalline medium directly adjacent to orientation layers O(1), O(2), O(3) and O(4) by means of double arrows, where the orientation axes are in each case twisted by 90° with respect to one another for O(1) and O(2), and are in each case twisted by 90° with respect to one another for O(3) and O(4).
Figure 5:
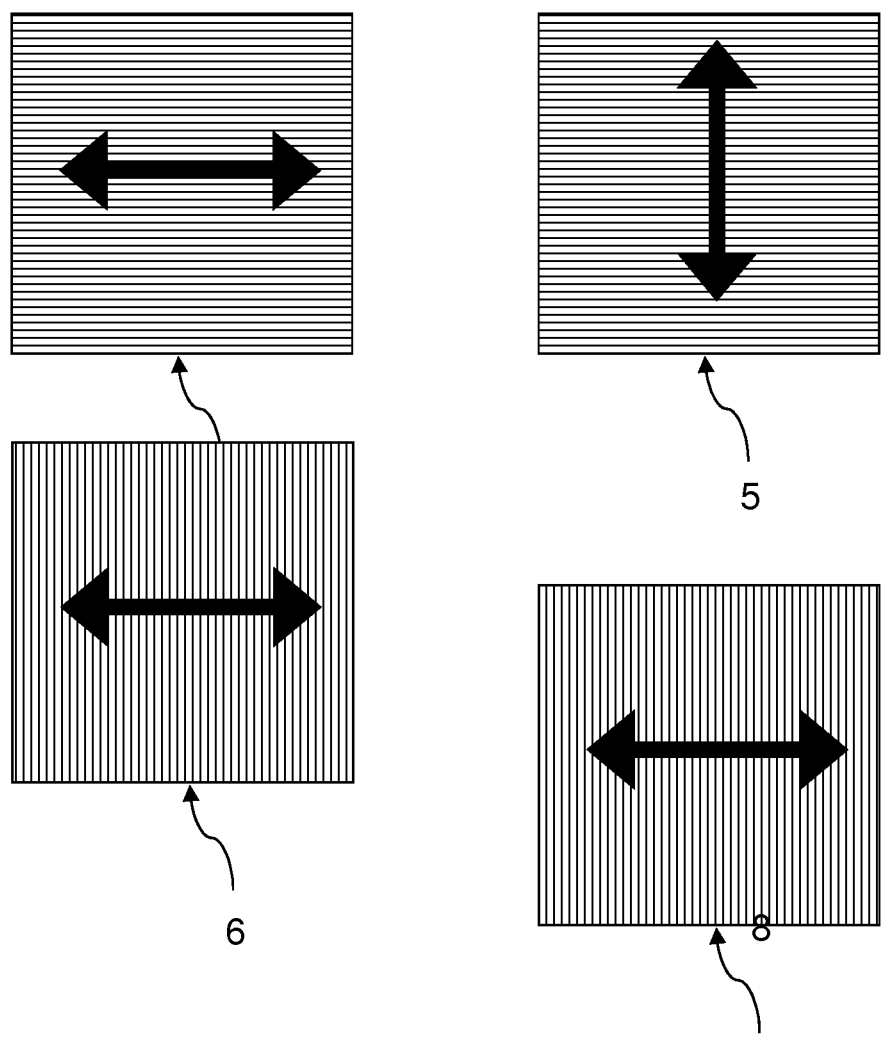
FIG. 5 shows, for a preferred embodiment of the device, A-1-3, the different orientation axis of the molecules of the liquid-crystalline medium directly adjacent to orientation layers O(1), O(2), O(3) and O(4) by means of double arrows, where the orientation axes are in each case the same for O(1) and O(2), and are in each case the same for O(3) and O(4).
Figure 6:
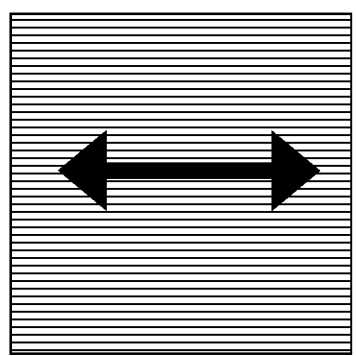
FIG. 6 shows, for a preferred embodiment of the device, A-1-4, the different orientation axis of the molecules of the liquid-crystalline medium directly adjacent to orientation layers O(1), O(2), O(3) and O(4) by means of double arrows, where the orientation axes are in each case the same for O(1) and O(2), and are in each case twisted by 90° with respect to one another for O(3) and O(4).
Figure 6:
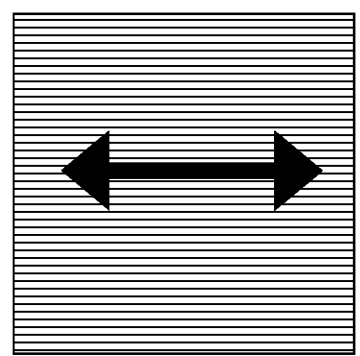
Figure 6:
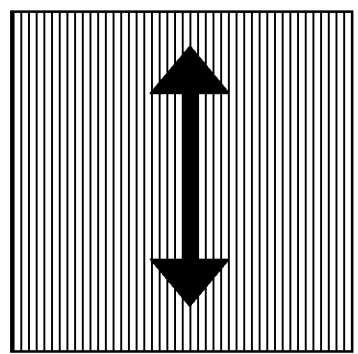
Figure 6:
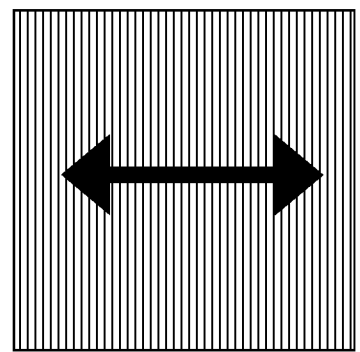

1 substrate layer, preferably comprising glass or polymer
2 electrically conductive layer
3 orientation layer O(1)
4 switching layer S(1)
5 orientation layer O(2)
6 orientation layer O(3)
7 switching layer S(2)
8 orientation layer O(4)

Working Examples

Structures of liquid-crystalline compounds are reproduced below by means of abbreviations (acronyms). These abbreviations are explicitly presented and explained in WO 2012/052100 (pp. 63-89), so that reference is made to the said published application for an explanation of the abbreviations in the present application.

All physical properties are determined in accordance with "Merck Liquid Crystals, Physical Properties of Liquid Crystals", Status November 1997, Merck KGaA, Germany, and apply for a temperature of 20° C. The value of Δn is determined at 589 nm, and the value of Δ∈ is determined at 1 kHz, unless explicitly indicated otherwise in each case.

A) Production of the Devices and Results Obtained

Devices E-1 to E-15 according to the invention and comparative devices V-1 to V-15 are produced.

The devices according to the invention have the following layer sequence, consisting of two crossed guest-host cells rubbed antiparallel (cell 1 and cell 2).

Cell 1
a) glass layer comprising polished 1.1 mm soda-lime glass from Corning
b) ITO layer, 200 ångström
c) alignment layer comprising polyimide AL-1054 from JSR, 300 ångström, rubbed antiparallel
d) liquid-crystalline layer (composition indicated below)), 24.3 μm
e) as c)
f) as b)
g) as a)

Cell 2

Identical structure to cell 1, arranged directly behind cell 1, but rotated by 90° thereto about an axis perpendicular through the layers.

The ITO layers are correspondingly provided with contacts in order to be electrically switchable.

Alternatively, an equivalent arrangement (TN cells) is possible which differs from the arrangement described above merely through the fact that the pair of orientation layers of each individual cell are not rubbed antiparallel, but instead are in each case twisted by 90° with respect to one another in their rubbing direction. The rubbing direction of the second orientation layer of cell 1 is rotated by 90° relative to the rubbing direction of the first, i.e. subsequent orientation layer of cell 2. The angles between the four orientation layers are thus as follows: 90° between the two orientation layers of cell 1; 90° between orientation layer 2 of cell 1 and orientation layer 1 of cell 2; 90° between the two orientation layers of cell 2. The present arrangement is thus in other words designed in such a way that cell 1 and cell 2 are in each case not rotated to one another about an axis perpendicular through the layers.

The comparative devices consist exclusively of cell 1, as described above.

TABLE 1

Composition of the liquid-crystalline layer and values obtained for $\tau_v$(bright), transmission range and degree of anisotropy R of the layer

| Device | Host mixture | Dye | Concentration/% | Degree of anisotropy R | $\tau_{v\ bright}$/% | Transmission range/% |
|---|---|---|---|---|---|---|
| E-1 | H1 | D1 | 0.02 | 0.73 | 91.4 | 29.9 |
|  |  | D2 | 0.04 |  |  |  |
|  |  | D3 | 0.04 |  |  |  |
| E-2 | H1 | D1 | 0.03 | 0.75 | 86.4 | 36.7 |
|  |  | D2 | 0.05 |  |  |  |
|  |  | D3 | 0.06 |  |  |  |
| E-3 | H1 | D1 | 0.05 | 0.68 | 75.7 | 50.0 |
|  |  | D2 | 0.10 |  |  |  |
|  |  | D3 | 0.12 |  |  |  |
| E-4 | H1 | D1 | 0.10 | 0.74 | 55.4 | 48.9 |
|  |  | D2 | 0.21 |  |  |  |
|  |  | D3 | 0.24 |  |  |  |
| E-5 | H1 | D1 | 0.17 | 0.73 | 38.1 | 36.7 |
|  |  | D2 | 0.35 |  |  |  |
|  |  | D3 | 0.40 |  |  |  |
| E-6 | H1 | D1 | 0.35 | ~0.73 | 13.8 | 13.7 |
|  |  | D2 | 0.74 |  |  |  |
|  |  | D3 | 0.84 |  |  |  |
| E-7 | H1 | D1 | 0.46 | ~0.73 | 8.3 | 8.2 |
|  |  | D2 | 0.95 |  |  |  |
|  |  | D3 | 1.09 |  |  |  |
| E-8 | H1 | D1 | 0.62 | ~0.73 | 3.4 | 3.3 |
|  |  | D2 | 1.29 |  |  |  |
|  |  | D3 | 1.47 |  |  |  |
| E-9 | H1 | D4 | 0.10 | 0.50 | 66.5 | 31.8 |
|  |  | D5 | 0.075 |  |  |  |
|  |  | D3 | 0.125 |  |  |  |
| E-10 | H1 | D4 | 0.20 | 0.49 | 44.9 | 32.1 |
|  |  | D5 | 0.15 |  |  |  |
|  |  | D3 | 0.25 |  |  |  |
| E-11 | H1 | D4 | 0.40 | 0.49 | 20.8 | 18.6 |
|  |  | D5 | 0.30 |  |  |  |
|  |  | D3 | 0.50 |  |  |  |
| E-12 | H2 | D1 | 0.03 | 0.79 | 89.0 | 38.2 |
|  |  | D2 | 0.05 |  |  |  |
|  |  | D3 | 0.06 |  |  |  |
| E-13 | H2 | D1 | 0.05 | 0.77 | 80.9 | 54.0 |
|  |  | D2 | 0.10 |  |  |  |
|  |  | D3 | 0.12 |  |  |  |
| E-14 | H2 | D1 | 0.10 | 0.75 | 63.1 | 55.9 |
|  |  | D2 | 0.21 |  |  |  |
|  |  | D3 | 0.24 |  |  |  |
| E-15 | H2 | D1 | 0.17 | 0.77 | 47.3 | 45.9 |
|  |  | D2 | 0.35 |  |  |  |
|  |  | D3 | 0.40 |  |  |  |
| V-1 | H1 | D1 | 0.02 | 0.73 | 94.3 | 15.6 |
|  |  | D2 | 0.04 |  |  |  |
|  |  | D3 | 0.04 |  |  |  |
| V-2 | H1 | D1 | 0.03 | 0.75 | 92.9 | 20.1 |
|  |  | D2 | 0.05 |  |  |  |
|  |  | D3 | 0.06 |  |  |  |
| V-3 | H1 | D1 | 0.05 | 0.68 | 87.5 | 29.7 |
|  |  | D2 | 0.10 |  |  |  |
|  |  | D3 | 0.12 |  |  |  |
| V-4 | H1 | D1 | 0.10 | 0.74 | 74.6 | 33.3 |
|  |  | D2 | 0.21 |  |  |  |
|  |  | D3 | 0.24 |  |  |  |
| V-5 | H1 | D1 | 0.17 | 0.73 | 62.0 | 29.9 |
|  |  | D2 | 0.35 |  |  |  |
|  |  | D3 | 0.40 |  |  |  |
| V-6 | H1 | D1 | 0.35 | ~0.73 | 36.9 | 17.5 |
|  |  | D2 | 0.74 |  |  |  |
|  |  | D3 | 0.84 |  |  |  |
| V-7 | H1 | D1 | 0.46 | ~0.73 | 29.4 | 13.5 |
|  |  | D2 | 0.95 |  |  |  |
|  |  | D3 | 1.09 |  |  |  |
| V-8 | H1 | D1 | 0.62 | ~0.73 | 17.9 | 7.9 |
|  |  | D2 | 1.29 |  |  |  |
|  |  | D3 | 1.47 |  |  |  |
| V-9 | H1 | D4 | 0.10 | 0.50 | 82.3 | 20.2 |
|  |  | D5 | 0.075 |  |  |  |
|  |  | D3 | 0.125 |  |  |  |
| V-10 | H1 | D4 | 0.20 | 0.49 | 67.1 | 24.6 |
|  |  | D5 | 0.15 |  |  |  |
|  |  | D3 | 0.25 |  |  |  |
| V-11 | H1 | D4 | 0.40 | 0.49 | 44.3 | 20.1 |
|  |  | D5 | 0.30 |  |  |  |
|  |  | D3 | 0.50 |  |  |  |
| V-12 | H2 | D1 | 0.03 | 0.79 | 93.8 | 20.7 |
|  |  | D2 | 0.05 |  |  |  |
|  |  | D3 | 0.06 |  |  |  |

TABLE 1-continued

Composition of the liquid-crystalline layer and values obtained for $\tau_v$(bright), transmission range and degree of anisotropy R of the layer

| Device | Host mixture | Dye | Concentration/% | Degree of anisotropy R | $\tau_{v\ bright}$/% | Transmission range/% |
|---|---|---|---|---|---|---|
| V-13 | H2 | D1 | 0.05 | 0.77 | 89.3 | 30.2 |
|  |  | D2 | 0.10 |  |  |  |
|  |  | D3 | 0.12 |  |  |  |
| V-14 | H2 | D1 | 0.10 | 0.75 | 79.2 | 35.2 |
|  |  | D2 | 0.21 |  |  |  |
|  |  | D3 | 0.24 |  |  |  |
| V-15 | H2 | D1 | 0.17 | 0.77 | 68.0 | 32.5 |
|  |  | D2 | 0.35 |  |  |  |
|  |  | D3 | 0.40 |  |  |  |

The results obtained show that significantly better values for the transmission range are obtained in all cases with the devices according to the invention (E-1 to E-15) for the same bright transmission than with devices which comprise only a single guest-host layer (V-1 to V-15).

With devices E-3 and E-13 according to the invention, for example, an excellent bright transmission (75.7% and 80.9% respectively) together with a large range (50.0% and 54.0% respectively) can be achieved. Such values cannot be achieved with the comparative devices, as shown by Example V-4 with the largest transmission range of all comparative examples. In the case of V-4, the bright transmission is similar to that in the case of E-3, but the range is significantly smaller (33.3%).

Even in the case of very high bright transmissions, the ranges achieved with the devices according to the invention are larger than with the comparative devices, as shown by Examples E-2 and E-12 (36.7 and 38.2% range), compared with V-3, V-9 and V-13, which merely have ranges between 20 and 30%.

Particularly excellent values for the transmission range are achieved if the liquid-crystalline layer has a high degree of anisotropy. The combination of high degree of anisotropy of the switching layer and the use of two switching layers has an effect which significantly exceeds the sum of the individual effects. A comparison of devices V-10 and V-15 shows that only an increase in the transmission range from 24.6 to 32.5% is achieved through an increased anisotropy alone (0.49 for V-10 compared with 0.77 for V-15). Only an increase to a similar extent is achieved through a change from single switching layer to double switching layer according to the invention for device E-10/V-10. By contrast, the transmission range increases from 24.6% to 45.9%, i.e. virtually doubles, if both a high degree of anisotropy and also a double layer according to the invention are used (V-10 compared with E-15).

A further surprising result of the investigations is that, even with high bright transmissions (greater than 45%, preferably greater than 55%, particularly preferably greater than 65%), as shown by Examples E-1 to E-4, E-9, E-12 to E-15, good results can be achieved for the transmission range if two switching layers are used in accordance with the invention. A combination of high bright transmission and large transmission range has hitherto not been reported for switching devices for regulating the passage of energy based on guest-host cells. However, the combination of these two properties is of major interest for use of the devices as switchable windows.

B) Composition of the Liquid-Crystalline Mixtures and Structures of the Dyes Used

TABLE 2

Composition of the host mixtures

| Host mixtures | H1 | H2 |
|---|---|---|
| Clearing point | 77.5° C. | 114.5° C. |
| Dielectric anisotropy Δε | 11.3 | 10.5 |
| Optical anisotropy Δn | 0.1255 | 0.1342 |

| Composition | Compound | % | Compound | % |
|---|---|---|---|---|
|  | PZG-2-N | 0.936 | CPG-3-F | 5 |
|  | PZG-3-N | 0.936 | CPG-5-F | 5 |
|  | PZG-4-N | 2.184 | CPU-3-F | 15 |
|  | PZG-5-N | 2.184 | CPU-5-F | 15 |
|  | CP-3-O1 | 7.488 | CP-3-N | 16 |
|  | CC-3-4 | 3.12 | CP-5-N | 16 |
|  | CPP-3-2 | 2.496 | CCGU-3-F | 7 |
|  | CCZGI-3-3 | 2.496 | CGPC-3-3 | 4 |
|  | CCZGI-3-5 | 2.496 | CGPC-5-3 | 4 |
|  | CCZPC-3-3 | 1.248 | CGPC-5-5 | 4 |
|  | CCZPC-3-4 | 1.248 | CCZPC-3-3 | 3 |
|  | CCZPC-3-5 | 0.936 | CCZPC-3-4 | 3 |
|  | CPZG-3-N | 1.248 | CCZPC-3-5 | 3 |
|  | CGPC-5-3 | 1.248 |  |  |
|  | CPPC-5-3 | 0.936 |  |  |
|  | CPU-3-F | 34.4 |  |  |
|  | CPU-5-F | 34.4 |  |  |

TABLE 3

Structures of the dyes used

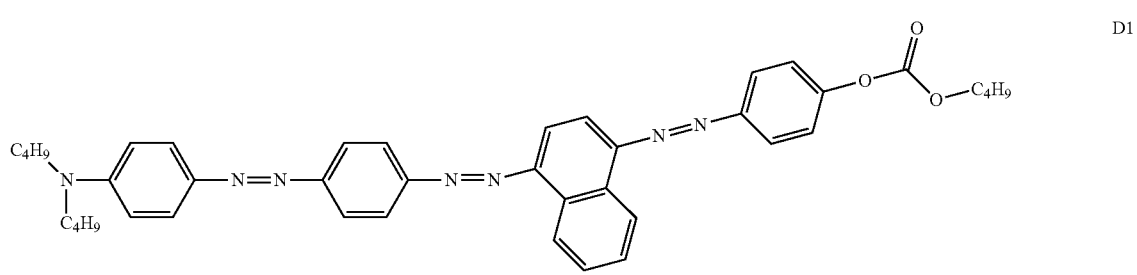

TABLE 3-continued

Structures of the dyes used

[Structure D2: azo dye with C4H9-phenyl-N=N-naphthyl-N=N-phenyl-O-C(=O)-phenyl-C5H11]

[Structure D3: C5H11-cyclohexyl-biphenyl-N=N-naphthyl-N=N-naphthyl-N=N-naphthyl-N(C2H5)(CH(CH3)-)]

[Structure D4: perylene dicarboxylic acid bis(sec-butyl) ester]

dye Lumogen 305 commercially available from BASF SE — D5

C) Methods Used for Determination of the Parameters $\tau_{v\ bright}$ (Degree of Light Transmission in the Bright State), Transmission Range and Degree of Anisotropy R 1) The degree of light transmission in the bright state $\tau_{v\ bright}$ is quoted in percent. It is calculated from the spectral degrees of transmission in the bright state of the device (device comprising two units each comprising two glass panes with orientation layers and liquid-crystalline medium comprising dichroic dyes arranged in-between), relative to an otherwise identical device without dye in the liquid-crystalline medium as reference. The spectral degrees of transmission here are measured using a Perkin Elmer Lambda 1050 UV spectrometer.

It is also possible to measure against air as reference here. In this case, reduced values are obtained for the bright and dark degrees of light transmission. However, the qualitative effects of the present invention are unchanged here.

The degree of light transmission $\tau_{v\ bright}$ is calculated in accordance with European Standard EN410, equation (1) (Determination of the luminous and solar characteristics of glazing). The degree of light transmission $\tau_v$ bright in accordance with this standard takes into account the relative spectral distribution of the standard illuminant and the spectral degree of brightness sensitivity of the standard observer.

2) The transmission range is quoted in percent. It represents the difference between the degree of light transmission of the switching layer in the bright state of the device ($\tau_{v\ bright}$) and the degree of light transmission of the switching layer in the dark state of the device ($\tau_{v\ dark}$). The value $\tau_{v\ dark}$ is determined here by the method indicated above for measurement of $\tau_{v\ bright}$ while the device is switched into the dark state.

3) The degree of anisotropy R of the switching layer is determined at 550 nm from the value for the absorbance E(p) of a device comprising two glass sheets with alignment layers and liquid-crystalline medium comprising dichroic dyes arranged in between, with parallel alignment of the dye molecules, and the value for the absorbance E(s) of the same device with perpendicular alignment of the dye molecules. Parallel alignment of the dye molecules is achieved by an alignment layer. The absorbance of the device is measured against a device which comprises no dye, but has an otherwise identical construction. The measurement is carried out using polarised light whose plane of vibration in one case vibrates parallel to the alignment direction (E(p)) and in a subsequent measurement vibrates perpendicular to the alignment direction (E(s)). The sample is not switched or rotated during the measurement. The measurement of E(p) and E(s) is thus carried out via the rotation of the plane of vibration of the incident polarised light.

In detail, the procedure followed is as described below: the spectra for measurement of E(s) and E(p) are recorded using a Perkin Elmer Lambda 1050 UV spectrometer. The spectrometer is fitted with a Glan-Thompson polariser for the wavelength range 250 nm-2500 nm in both the measurement and reference beams. The two polarisers are controlled by a stepping motor and are aligned in the same direction. A change in the polariser direction of the polariser, for example changeover from 0° to 90°, is always carried out synchronously and in the same direction for the measurement and reference beams. The alignment of an individual polariser can be determined using a method which is described in the dissertation by T. Karstens, University of Würzburg, 1973. In this method, the polariser is rotated in 5° steps against an aligned dichroic sample, and the absorbance is recorded at a fixed wavelength, preferably in the region of maximum absorption. A new zero line is run for each polariser position.

For measurement of the two dichroic spectra E(p) and E(s), an antiparallel-rubbed test cell, coated with polyimide AL-1054 from JSR, is located in both the measurement and reference beams. The two test cells should be selected of the same layer thickness, typically 15-25 μm. The test cell containing pure liquid-crystalline medium is located in the reference beam. The test cell containing the solution of dichroic dye in the liquid-crystalline medium is located in the measurement beam. The two test cells for measurement and reference beams are installed in the ray path in the same alignment direction. In order to guarantee the greatest possible accuracy of the spectrometer, it is ensured that E(p) is in the wavelength range of its greatest absorption, preferably between 0.5 and 1.5. This corresponds to transmissions of 30%-5%. This is set by corresponding adjustment of the layer thickness and/or dye concentration.

The degree of anisotropy R is calculated from the measured values for E(p) and E(s) in accordance with the formula $$R=[E(p)-E(s)]/[E(p)+2*E(s)],$$

as indicated, inter alia, in "Polarized Light in Optics and Spectroscopy", D. S. Kliger et al., Academic Press, 1990.

The invention claimed is:

1. A device suitable for regulating the passage of energy through a surface, comprising
    at least two switching layers S(1) and S(2), each of which comprises a liquid-crystalline medium having a clearing point in the temperature range of 70° C. to 170° C. and comprising three or more dichroic compounds, and orientation layers O(1), O(2), O(3) and O(4),
    where the said switching layers and orientation layers are present in the device in mutually parallel planes in the sequence O(1), S(1), O(2), O(3), S(2), O(4),
    where an orientation axis OA(1)* of the molecules of the liquid-crystalline medium of S(1) which are adjacent to O(2) is present in at least one switching state of the device, and an orientation axis OA(2)* of the molecules of the liquid-crystalline medium of S(2) which are adjacent to O(3) is present, and orientation axes OA(1)* and OA(2)* are not parallel to one another and are parallel to the plane of the switching layers,
    wherein the device is arranged to have the capability to switch between a bright state and a dark state,
    wherein the device is electrically switchable from a dark state to a bright state and vice versa, wherein the degree of light transmission in the bright state is 60% to 90%, and
    wherein the device is not goggles, visors or eyeglasses suitable for regulation of the incidence of light on the eyes.

2. A device suitable for regulating the passage of energy through a surface, comprising
    at least two switching layers S(1) and S(2), each of which comprises a liquid-crystalline medium having a clearing point in the temperature range of 70° C. to 170° C. and comprising three or more dichroic compounds, and orientation layers O(1), O(2), O(3) and O(4),
    where the said switching layers and orientation layers are present in the device in mutually parallel planes in the sequence O(1), S(1), O(2), O(3), S(2), O(4),
    where an orientation axis OA(1)* of the molecules of the liquid-crystalline medium of S(1) which are adjacent to O(2) is present in at least one switching state of the device, and an orientation axis OA(2)* of the molecules of the liquid-crystalline medium of S(2) which are adjacent to O(3) is present, and orientation axes OA(1)* and OA(2)* are not parallel to one another and are parallel to the plane of the switching layers,
    wherein the device is arranged to have the capability to switch between a bright state and a dark state, and
    wherein the device is not goggles, visors or eyeglasses suitable for regulation of the incidence of light on the eyes,
    wherein the device is electrically switchable, and
    which device is installed in an opening of a building, a container, a vehicle or another substantially closed space.

3. The device according to claim 1, which has four electrodes, one of which is installed on each side of each of the two switching layers.

4. The device according to claim 1, wherein the switching layers are separately electrically switchable.

5. The device according to claim 1, wherein the molecules of the liquid-crystalline medium are aligned vertically to the plane of the switching layers by application of an electric field.

6. The device according to claim 1, wherein either both switching layers S(1) and S(2) in the voltage-free switching state have a planar alignment of the molecules of the liquid-crystalline medium, or both switching layers S(1) and S(2) in the voltage-free switching state have a homeotropic alignment of the molecules of the liquid-crystalline medium.

7. The device according to claim 1, wherein one of the two switching layers S(1) and S(2) in the voltage-free switching state has a homeotropic alignment of the molecules of the liquid-crystalline medium, and the other of the two switching layers S(1) and S(2) in the voltage-free switching state has a planar alignment of the molecules of the liquid-crystalline medium.

8. The device according to claim 1, which has a device for the conversion of light energy into electrical energy.

9. The device according to claim 1, which has a layer structure in the following sequence:
    substrate layer,
    electrically conductive transparent layer,
    orientation layer O(1),
    switching layer S(1),
    orientation layer O(2),
    electrically conductive transparent layer,
    substrate layer(s),
    electrically conductive transparent layer, preferably ITO layer
    orientation layer O(3),
    switching layer S(2),
    orientation layer O(4),
    electrically conductive transparent layer, and
    substrate layer.

10. The device according to claim 1, wherein orientation axes OA(1)* and OA(2)* form an angle of 50- 90° to one another.

11. The device according to claim 1, wherein the at least one switching state of the device in which orientation axes OA(1)* and OA(2)* are not parallel to one another and are parallel to the plane of the switching layers is present in a voltage-free switching state of the device.

12. The device according to claim 1, wherein orientation layers O(2) and O(3) each effect different orientation axes of the molecules of the liquid-crystalline medium which is adjacent to the orientation layer.

13. The device according to claim 1, wherein layers O(2) and O(3) in the voltage-free switching state effect a planar alignment of the molecules of the liquid-crystalline medium.

14. The device according to claim 1, wherein either both orientation layers O(1) and O(2) effect a planar alignment of the molecules of the liquid-crystalline medium, or both orientation layers O(1) and O(2) effect a homeotropic alignment of the molecules of the liquid-crystalline medium.

15. The device according to claim 1, wherein switching layers S(1) and S(2) have a degree of anisotropy R of 0.7 to 0.9.

16. The device according to claim 15, wherein at least one of the dichroic compounds is selected from the group consisting of azo compounds, anthraquinones, methine compounds, azomethine compounds, merocyanine compounds, naphthoquinones, tetrazines, perylenes, terrylenes, quaterrylenes, higher rylenes, benzothiadiazoles, diketopyrrolopyrroles, squaraines and pyrromethenes.

17. The device according to claim 1, which does not comprise a polariser.

18. A method for regulating the passage of energy through a substantially energy-transmitting surface into an interior, comprising regulating said passage of energy by a device according to claim 1.

19. A window comprising a device according to claim 1.

20. The device according to claim 1, wherein the liquid-crystalline medium contains three dichroic compounds.

\* \* \* \* \*